(12) United States Patent
Suzuki et al.

(10) Patent No.: US 11,021,044 B2
(45) Date of Patent: ***Jun. 1, 2021

(54) VEHICLE AIR CONDITIONER DEVICE

(71) Applicant: SANDEN HOLDINGS CORPORATION, Isesaki (JP)

(72) Inventors: Kenichi Suzuki, Isesaki (JP); Ryo Miyakoshi, Isesaki (JP); Kouhei Yamashita, Isesaki (JP); Megumi Shigeta, Isesaki (JP)

(73) Assignee: Sanden Holdings Corporation, Isesaki (JP)

( * ) Notice: Subject to any disclaimer, the term of this patent is extended or adjusted under 35 U.S.C. 154(b) by 145 days.

This patent is subject to a terminal disclaimer.

(21) Appl. No.: 16/295,960

(22) Filed: Mar. 7, 2019

(65) Prior Publication Data

US 2019/0210429 A1   Jul. 11, 2019

Related U.S. Application Data

(62) Division of application No. 15/315,959, filed as application No. PCT/JP2015/057725 on Mar. 16, 2015, now Pat. No. 10,562,375.

(30) Foreign Application Priority Data

Jun. 3, 2014   (JP) .................................. 2014-114965

(51) Int. Cl.
*B60H 1/32*   (2006.01)
*B60H 1/00*   (2006.01)
*B60H 1/22*   (2006.01)

(52) U.S. Cl.
CPC ......... *B60H 1/321* (2013.01); *B60H 1/00385* (2013.01); *B60H 1/00921* (2013.01);
(Continued)

(58) Field of Classification Search
CPC .. B60H 1/321; B60H 1/3211; B60H 1/00785; B60H 1/00921; B60H 1/00385;
(Continued)

(56) References Cited

U.S. PATENT DOCUMENTS 6,430,951 B1 *   8/2002   Iritani ................ B60H 1/00021
                                                        62/229
7,150,158 B2 *  12/2006   Morita ............... B60H 1/00792
                                                        62/158
(Continued)

FOREIGN PATENT DOCUMENTS

JP   H06-061524 U   8/1994
JP   H06-344764 A  12/1994
(Continued)

OTHER PUBLICATIONS

Japan Patent Office, International Search Report issued in International Application No. PCT/JP2015/057725, dated Jun. 9, 2015.
(Continued)

*Primary Examiner* — Joel M Attey
*Assistant Examiner* — For K Ling
(74) *Attorney, Agent, or Firm* — Baker Botts L.L.P.

(57) ABSTRACT

There is disclosed a vehicle air conditioner device of a so-called heat pump system to accurately perform efficient and comfortable heating of a vehicle interior. The vehicle air conditioner device includes a heating medium circulating circuit 23 which heats air to be supplied from an air flow passage 3 to a vehicle interior. A controller calculates a required heating capability TGQhtr of the heating medium circulating circuit to complement a shortage of an actual heating capability Qhp to a required heating capability TGQ of a radiator 4. The controller calculates a decrease amount ΔQhp of the actual heating capability Qhp from a difference ΔTXO between a refrigerant evaporation temperature TXO
(Continued)

of an outdoor heat exchanger 7 and a refrigerant evaporation temperature TXObase in non-frosting, and adds the decrease amount ΔQhp to the required heating capability TGQhtr to execute the heating by the heating medium circulating circuit.

14 Claims, 11 Drawing Sheets

(52) U.S. Cl.
CPC . *B60H 1/2221* (2013.01); *B60H 2001/00949* (2013.01); *B60H 2001/00961* (2019.05); *B60H 2001/3258* (2013.01); *B60H 2001/3263* (2013.01); *B60H 2001/3272* (2013.01); *B60H 2001/3283* (2013.01)

(58) Field of Classification Search
CPC .............. B60H 1/0075; B60H 1/00764; B60H 1/00807; B60H 1/00864; B60H 1/2221; B60H 1/2225; B60H 1/2237; B60H 1/225; B60H 2001/00961

See application file for complete search history.

(56) References Cited

U.S. PATENT DOCUMENTS

| 2010/0326127 | A1* | 12/2010 | Oomura | F25B 41/04 62/498 |
| 2011/0016896 | A1* | 1/2011 | Oomura | F25D 21/004 62/155 |
| 2013/0055743 | A1* | 3/2013 | Ogasawara | B60H 1/00921 62/156 |
| 2013/0081419 | A1* | 4/2013 | Katoh | B60H 1/004 62/278 |

FOREIGN PATENT DOCUMENTS

| JP | 2005-132176 A | 5/2005 |
| JP | 3985384 B2 | 10/2007 |
| JP | 2011-017474 A | 1/2011 |
| JP | 2012-144177 A | 8/2012 |
| JP | 2014-058209 A | 4/2014 |
| JP | 2014-094676 A | 5/2014 |

OTHER PUBLICATIONS

The State Intellectual Property Office of the People's Republic of China, The First Office Action issued in Chinese Application No. CN 201580026853.5, dated May 4, 2018.

* cited by examiner

FIG. 10

VEHICLE AIR CONDITIONER DEVICE

CROSS-REFERENCE TO RELATED APPLICATIONS

This application is a divisional of U.S. patent application Ser. No. 15/315,959, filed on Dec. 2, 2016, which is a U.S. National Stage patent application under 37 U.S.C. § 371 of International Patent Application No. PCT/JP2015/057725, filed on Mar. 16, 2015, which claims the benefit of Japanese Patent Application No. JP 2014-114965, filed on Jun. 3, 2014, the disclosures of each of which are incorporated herein by reference in their entirety.

TECHNICAL FIELD

The present invention relates to an air conditioner device of a heat pump system which conditions air in a vehicle interior, and more particularly, it relates to a vehicle air conditioner device which is suitable for a hybrid car or an electric car.

BACKGROUND ART

Due to actualization of environmental problems in recent years, hybrid cars and electric cars have spread. Further, as an air conditioner device which is applicable to such a vehicle, there has been developed an air conditioner device which includes a compressor to compress and discharge a refrigerant, a radiator (a condenser) disposed in a vehicle interior to let the refrigerant radiate heat, a heat absorber (an evaporator) disposed in the vehicle interior to let the refrigerant absorb heat, and an outdoor heat exchanger disposed outside the vehicle interior to let the refrigerant radiate or absorb heat, and which changes and executes respective modes of a heating mode to let the refrigerant discharged from the compressor radiate heat in the radiator and let the refrigerant by which heat has been radiated in this radiator absorb heat in the outdoor heat exchanger, a dehumidifying mode to let the refrigerant discharged from the compressor radiate heat in the radiator and let the refrigerant by which heat has been radiated in the radiator absorb heat in the heat absorber, and a cooling mode to let the refrigerant discharged from the compressor radiate heat in the outdoor heat exchanger and let the refrigerant absorb heat in the heat absorber (e.g., see Patent Document 1).

Furthermore, in Patent Document 1, there is provided an injection circuit which distributes the refrigerant flowing out from the radiator, decompresses this distributed refrigerant, and then performs heat exchange with the refrigerant flowing out from the radiator to return the refrigerant to the middle of the compression by the compressor, thereby increasing the refrigerant discharged from the compressor and improving a heating capability of the radiator.

CITATION LIST

Patent Documents

Patent Document 1: Publication of Japanese Patent No. 3985384

SUMMARY OF THE INVENTION

Problems to be Solved by the Invention

However, in such an air conditioner device as described above, heat cannot be absorbed from outdoor air in a case where frosting occurs onto an outdoor heat exchanger, and hence there is the problem that a desirable heating capability cannot be obtained. FIG. 11 shows this behavior. The abscissa indicates a refrigerant evaporation temperature TXO of an outdoor heat exchanger (or a suction refrigerant temperature Ts of a compressor) and the ordinate indicates a heating capability (an actual heating capability) actually generated by a radiator. Furthermore, in the drawing, TXObase is a refrigerant evaporation temperature in non-frosting of the outdoor heat exchanger.

As it is clear from this drawing, the refrigerant evaporation temperature TXO becomes lower than the refrigerant evaporation temperature TXObase in non-frosting when the frosting occurs onto the outdoor heat exchanger (a difference $\Delta TXO=TXObase-TXO$). It is also seen that the heating capability of the radiator accordingly decreases at each number of revolution of the compressor. It is to be noted that with decrease of the number of revolution of the compressor, the refrigerant evaporation temperature TXO rises.

Furthermore, a temperature of a refrigerant flowing out from the radiator is low, and hence an amount of heat exchange between the refrigerant and a distributed and decompressed refrigerant also decreases. Therefore, for the purpose of injecting a gas in the middle of the compression by the compressor, there is a limit to increasing of an amount of the refrigerant flowing through an injection circuit, the refrigerant discharged from the compressor cannot sufficiently increase, and as a result, there is the defect that the heating capability cannot sufficiently be obtained.

The present invention has been developed to solve such a conventional technical problem, and an object thereof is to accurately perform efficient and comfortable heating of a vehicle interior in a vehicle air conditioner device of a so-called heat pump system.

Means for Solving the Problems

A vehicle air conditioner device of the present invention includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, and control means, the vehicle air conditioner device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, the vehicle air conditioner device further includes auxiliary heating means for heating the air to be supplied from the air flow passage to the vehicle interior, and the vehicle air conditioner device is characterized in that on the basis of a required heating capability TGQ which is a required heating capability of the radiator and an actual heating capability Qhp which is actually generated by the radiator, the control means calculates a required heating capability TGQhtr of the auxiliary heating means to complement a shortage of the actual heating capability Qhp to the required heating capability TGQ, and the control means calculates a decrease amount $\Delta Qhp$ of the actual heating capability Qhp due to frosting of the outdoor heat exchanger on the basis of a difference $\Delta TXO$ between the refrigerant evaporation temperature TXO of the outdoor heat exchanger and the refrigerant evaporation temperature TXObase of the outdoor heat exchanger in non-frosting, and adds the decrease amount ΔQhp to the required heating capability TGQhtr of the auxiliary heating means to execute heating by the auxiliary heating means.

The vehicle air conditioner device of the invention of claim 2 is characterized in that in the above invention, the control means calculates a frosting ratio of the outdoor heat exchanger on the basis of the difference ΔTXO, and in a case where this frosting ratio is not less than a predetermined value, the control means stops the compressor and controls the auxiliary heating means in accordance with the required heating capability TGQ.

The vehicle air conditioner device of the invention of claim 3 is characterized in that in the invention of claim 1, the control means calculates the frosting ratio of the outdoor heat exchanger on the basis of the decrease amount ΔQhp of the actual heating capability, and in a case where this frosting ratio is not less than a predetermined value, the control means stops the compressor and controls the auxiliary heating means in accordance with the required heating capability TGQ.

The vehicle air conditioner device of the invention of claim 4 is characterized in that in the invention of claim 1, the control means calculates a maximum heating capability Qhpmax to be generated by the radiator, calculates a decrease amount ΔQhpmax of the maximum heating capability Qhpmax due to the frosting of the outdoor heat exchanger on the basis of the difference ΔTXO, and calculates a frosting ratio of the outdoor heat exchanger on the basis of the decrease amount ΔQhpmax of this maximum heating capability, and in a case where this frosting ratio is not less than a predetermined value, the control means stops the compressor and controls the auxiliary heating means in accordance with the required heating capability TGQ.

The vehicle air conditioner device of the invention of claim 5 is characterized in that in the invention of claim 1, the control means calculates a maximum heating capability Qhpmax to be generated by the radiator, and calculates a decrease amount ΔQhpmax of the maximum heating capability Qhpmax due to the frosting of the outdoor heat exchanger on the basis of the difference ΔTXO, and in a case where this decrease amount ΔQhpmax is not less than a predetermined value, the control means stops the compressor and controls the auxiliary heating means in accordance with the required heating capability TGQ.

The vehicle air conditioner device of the invention of claim 6 is characterized in that in the invention of claim 1, the control means stops the compressor and controls the auxiliary heating means in accordance with the required heating capability TGQ in a case where the decrease amount ΔQhp of the actual heating capability is not less than a predetermined value.

The vehicle air conditioner device of the invention of claim 7 is characterized in that in the above respective inventions, the control means calculates the maximum heating capability Qhpmax on the basis of an air volume Ga of air passing the radiator, an outdoor air temperature Tam, and an upper limit number of revolution Ncmax of the compressor, and calculates the actual heating capability Qhp on the basis of the air volume Ga, the outdoor air temperature Tam and an actual number of revolution Nc of the compressor.

The vehicle air conditioner device of the invention of claim 8 is characterized in that in the inventions of claim 1 to claim 6, the control means calculates the actual heating capability Qhp on the basis of a difference (THout−THin) between a temperature THout of air passed through the radiator and a suction air temperature THin of the radiator, specific heat Ca of the air flowing into the radiator, and the air volume Ga of the air passing the radiator.

The vehicle air conditioner device of the invention of claim 9 is characterized in that in the invention of claim 7, in a case where the auxiliary heating means is disposed together with the radiator on an upstream side of the radiator to a flow of the air of the air flow passage, the control means calculates the maximum heating capability Qhpmax and the actual heating capability Qhp in consideration of a suction air temperature THin of the radiator.

The vehicle air conditioner device of the invention of claim 10 is characterized in that each of the above inventions includes a heating medium circulating circuit which has a heating medium-air heat exchanger, an electric heater, and circulating means and in which the circulating means circulates a heating medium heated by the electric heater through the heating medium-air heat exchanger, and the heating medium-air heat exchanger constitutes the auxiliary heating means.

The vehicle air conditioner device of the invention of claim 11 is characterized in that in the inventions of claim 1 to claim 9, the auxiliary heating means is constituted of an electric heater.

The vehicle air conditioner device of the invention of claim 12 is characterized in that in the inventions of claim 1 to claim 8, the radiator is disposed outside the air flow passage, and the auxiliary heating means is constituted of a heating medium circulating circuit which has a heating medium-refrigerant heat exchanger to perform heat exchange with this radiator, a heating medium-air heat exchanger disposed in the air flow passage, an electric heater and circulating means and in which the circulating means circulates a heating medium heated by the heating medium-refrigerant heat exchanger and/or the electric heater through the heating medium-air heat exchanger.

Advantageous Effect of the Invention

According to the present invention, a vehicle air conditioner device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, and control means, the vehicle air conditioner device executes at least a heating mode in which the control means lets the refrigerant discharged from the compressor radiate heat in the radiator, decompresses the refrigerant by which heat has been radiated, and then lets the refrigerant absorb heat in the outdoor heat exchanger, the vehicle air conditioner device includes auxiliary heating means for heating the air to be supplied from the air flow passage to the vehicle interior, and on the basis of a required heating capability TGQ which is a required heating capability of the radiator and an actual heating capability Qhp which is actually generated by the radiator, the control means calculates a required heating capability TGQhtr of the auxiliary heating means to complement a shortage of the actual heating capability Qhp to the required heating capability TGQ, to execute heating by the auxiliary heating means. Therefore, in a case where the actual heating capability Qhp of the radiator runs short to the required heating capability TGQ, the auxiliary heating means heats the air to be supplied to the vehicle interior, so that it is possible to complement the heating capability and achieve comfortable heating of the vehicle interior.

Furthermore, the heating by the auxiliary heating means is executed under a situation where the heating capability of the radiator runs short, and hence it is possible to minimize deterioration of an efficiency due to the heating by the auxiliary heating means. Consequently, it is possible to effectively inhibit the disadvantage that a driving distance decreases especially in an electric car.

Particularly, the control means calculates a decrease amount ΔQhp of the actual heating capability Qhp due to frosting of the outdoor heat exchanger, and adds the decrease amount ΔQhp to the required heating capability TGQhtr of the auxiliary heating means to execute the heating by the auxiliary heating means, and hence in a case where the frosting occurs onto the outdoor heat exchanger to decrease the actual heating capability Qhp, the auxiliary heating means can complement the decrease amount ΔQhp, and comfort can further improve.

In this case, the control means calculates the decrease amount ΔQhp of the actual heating capability Qhp due to the frosting of the outdoor heat exchanger on the basis of a difference ΔTXO between the refrigerant evaporation temperature TXO of the outdoor heat exchanger and the refrigerant evaporation temperature TXObase of the outdoor heat exchanger in non-frosting, and hence it is possible to precisely calculate the decrease amount ΔQhp and accurately execute control of the auxiliary heating means.

At this time, as in the invention of claim 2, the control means calculates a frosting ratio of the outdoor heat exchanger on the basis of the difference ΔTXO, and in a case where this frosting ratio is not less than a predetermined value, the control means stops the compressor and controls the auxiliary heating means in accordance with the required heating capability TGQ. In this case, a proceeding degree of the frosting onto the outdoor heat exchanger is grasped from the difference ΔTXO, and in a case where the frosting proceeds, it is possible to change to the heating of the vehicle interior only by the auxiliary heating means. In consequence, it is possible to continuously perform the heating of the vehicle interior by the auxiliary heating means while preventing further growth of the frost formed on the outdoor heat exchanger or promoting melting of the frost.

Furthermore, as in the invention of claim 3, the control means calculates the frosting ratio of the outdoor heat exchanger on the basis of the decrease amount ΔQhp of the actual heating capability, and in a case where this frosting ratio is not less than a predetermined value, the control means stops the compressor and controls the auxiliary heating means in accordance with the required heating capability TGQ. Also in this case, the proceeding degree of the frosting onto the outdoor heat exchanger is grasped from the decrease amount ΔQhp of the actual heating capability, and in the case where the frosting proceeds, it is possible to change to the heating of the vehicle interior only by the auxiliary heating means. In consequence, it is similarly possible to continuously perform the heating of the vehicle interior by the auxiliary heating means while preventing further growth of the frost formed on the outdoor heat exchanger or promoting the melting of the frost.

Furthermore, as in the invention of claim 4, the control means calculates a maximum heating capability Qhpmax to be generated by the radiator, calculates a decrease amount ΔQhpmax of the maximum heating capability Qhpmax due to the frosting of the outdoor heat exchanger on the basis of the difference ΔTXO, and calculates a frosting ratio of the outdoor heat exchanger on the basis of the decrease amount ΔQhpmax of this maximum heating capability, and in a case where this frosting ratio is not less than a predetermined value, the control means stops the compressor and controls the auxiliary heating means in accordance with the required heating capability TGQ. Also in this case, the proceeding degree of the frosting onto the outdoor heat exchanger is grasped from the decrease amount ΔQhpmax of the maximum heating capability, and in the case where the frosting proceeds, it is possible to change to the heating of the vehicle interior only by the auxiliary heating means. In consequence, it is similarly possible to continuously perform the heating of the vehicle interior by the auxiliary heating means while preventing further growth of the frost formed on the outdoor heat exchanger or promoting the melting of the frost.

Furthermore, as in the invention of claim 5, the control means calculates a maximum heating capability Qhpmax to be generated by the radiator, and calculates a decrease amount ΔQhpmax of the maximum heating capability Qhpmax due to the frosting of the outdoor heat exchanger on the basis of the difference ΔTXO, and in a case where this decrease amount ΔQhpmax is not less than a predetermined value, the control means stops the compressor and controls the auxiliary heating means in accordance with the required heating capability TGQ. Also in this case, the proceeding degree of the frosting onto the outdoor heat exchanger is directly judged from the decrease amount ΔQhpmax of the maximum heating capability, and in the case where the frosting proceeds, it is possible to change to the heating of the vehicle interior only by the auxiliary heating means. In consequence, it is similarly possible to continuously perform the heating of the vehicle interior by the auxiliary heating means while preventing further growth of the frost formed on the outdoor heat exchanger or promoting the melting of the frost.

Furthermore, as in the invention of claim 6, the control means stops the compressor and controls the auxiliary heating means in accordance with the required heating capability TGQ in a case where the decrease amount ΔQhp of the actual heating capability is not less than a predetermined value. Also in this case, the proceeding degree of the frosting onto the outdoor heat exchanger is directly judged from the decrease amount ΔQhp of the actual heating capability, and in the case where the frosting proceeds, it is possible to change to the heating of the vehicle interior only by the auxiliary heating means. In consequence, it is similarly possible to continuously perform the heating of the vehicle interior by the auxiliary heating means while preventing further growth of the frost formed on the outdoor heat exchanger or promoting the melting of the frost.

In this case, as in the invention of claim 7, the control means calculates the maximum heating capability Qhpmax on the basis of an air volume Ga of air passing the radiator, an outdoor air temperature Tam, and an upper limit number of revolution Ncmax of the compressor, and calculates the actual heating capability Qhp on the basis of the air volume Ga, the outdoor air temperature Tam and an actual number of revolution Nc of the compressor, so that it is possible to accurately control judgment of the heating capability of the radiator and heating by the auxiliary heating means which accompanies the shortage of the capability.

At this time, as in the invention of claim 9, in a case where the auxiliary heating means is disposed together with the radiator on an upstream side of the radiator to a flow of air of the air flow passage, the control means calculates the maximum heating capability Qhpmax and the actual heating capability Qhp in consideration of a suction air temperature THin of the radiator. Consequently, in a case where the air heated by the auxiliary heating means flows into the radiator, it is possible to correctly calculate the maximum heating capability Qhpmax or the actual heating capability Qhp in consideration of a change of a heat quantity which accompanies the inflow of the heated air.

Furthermore, as in the invention of claim 8, the control means calculates the actual heating capability Qhp on the basis of a difference (THout−THin) between a temperature THout of air passed through the radiator and a suction air temperature THin of the radiator, specific heat Ca of the air flowing into the radiator, and the air volume Ga of the air passing the radiator. Also in this case, it is possible to accurately calculate the actual heating capability Qhp of the radiator and control the heating by the auxiliary heating means.

It is to be noted that as in the invention of claim 10, the vehicle air conditioner device includes a heating medium circulating circuit which has a heating medium-air heat exchanger, an electric heater, and circulating means and in which the circulating means circulates a heating medium heated by the electric heater through the heating medium-air heat exchanger, and the heating medium-air heat exchanger constitutes the auxiliary heating means, so that it is possible to achieve electrically safe heating of the vehicle interior.

On the other hand, when the auxiliary heating means is constituted of an electric heater as in the invention of claim 11, it is possible to simplify a structure.

Furthermore, as in the invention of claim 12, the radiator is disposed outside the air flow passage, and the auxiliary heating means is constituted of a heating medium circulating circuit which has a heating medium-refrigerant heat exchanger to perform heat exchange with this radiator, a heating medium-air heat exchanger disposed in the air flow passage, an electric heater and circulating means and in which the circulating means circulates a heating medium heated by the heating medium-refrigerant heat exchanger and/or the electric heater through the heating medium-air heat exchanger, and also in this case, electric safety can improve.

BRIEF DESCRIPTION OF THE DRAWINGS

FIG. 10 is a constitutional view of a vehicle air conditioner device of a still further embodiment to which the present invention is applied.

MODE FOR CARRYING OUT THE INVENTION

Hereinafter, embodiments of the present invention will be described in detail with reference to the drawings.

Figure 1:
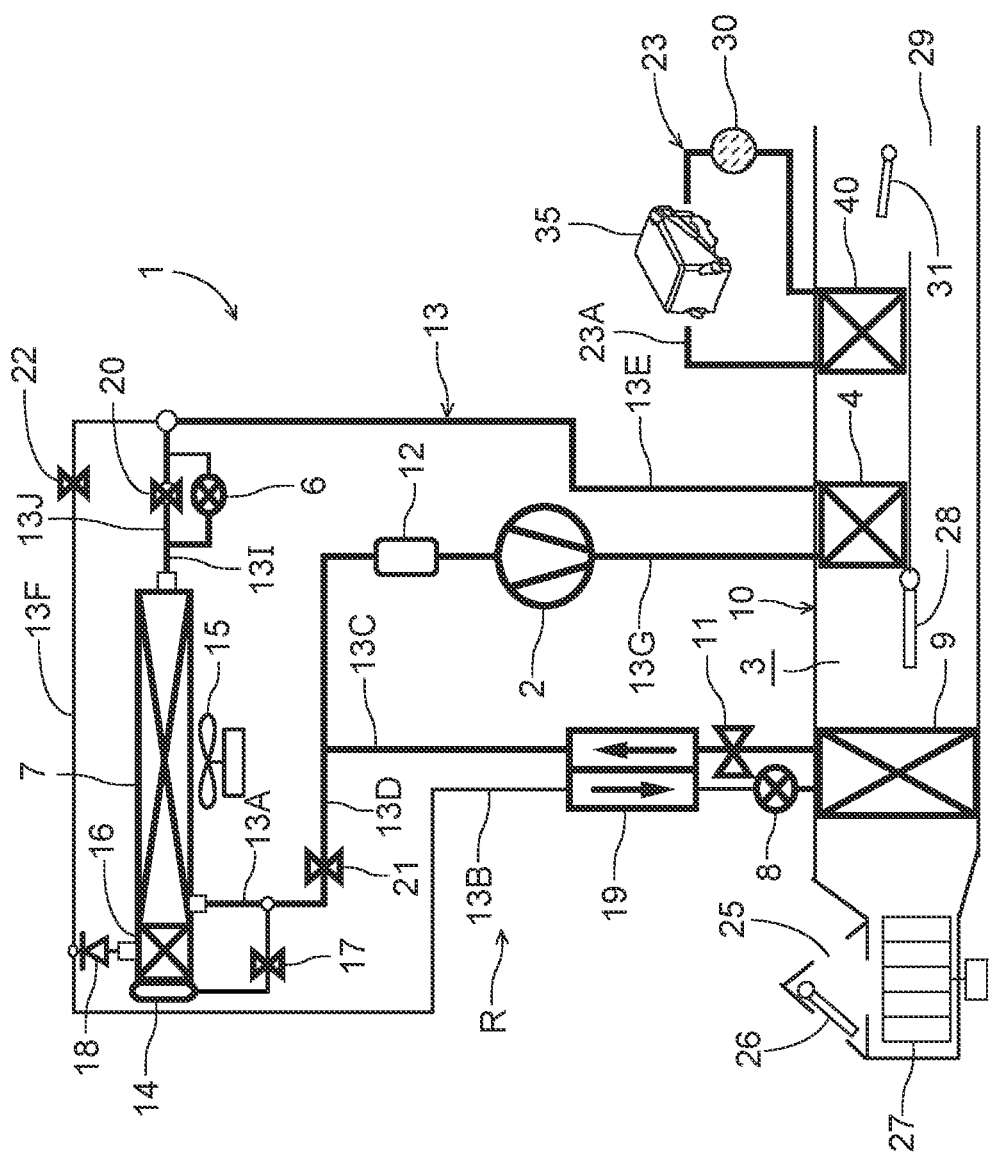
FIG. 1 is a constitutional view of a vehicle air conditioner device of one embodiment to which the present invention is applied.
Figure 2:
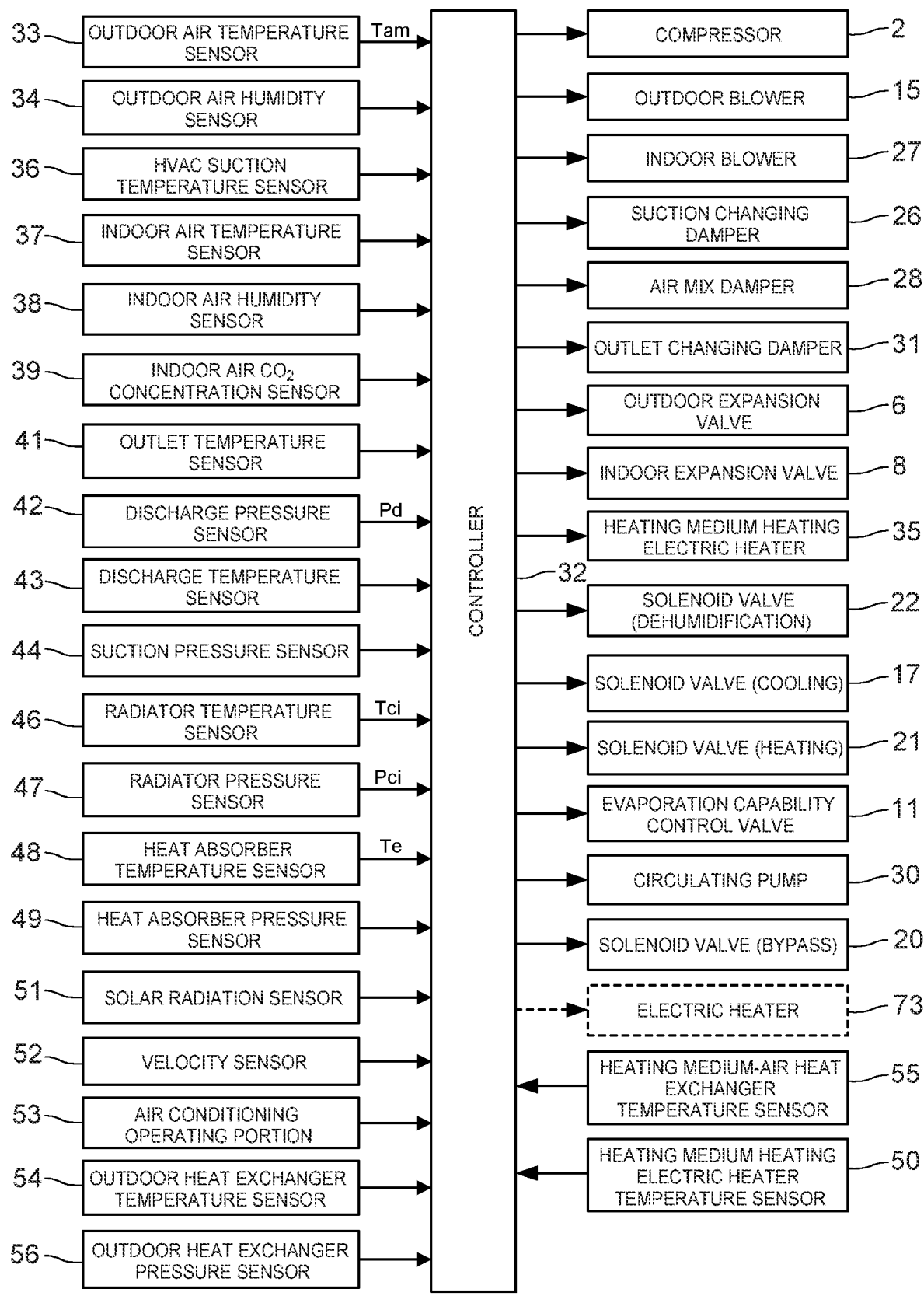
FIG. 2 is a block diagram of an electric circuit of a controller of the vehicle air conditioner device of FIG. 1.

FIG. 1 shows a constitutional view of a vehicle air conditioner device 1 of one embodiment of the present invention. A vehicle of the embodiment to which the present invention is applied is an electric car (EV) in which an engine (an internal combustion engine) is not mounted and which runs by driving an electric motor for running with power charged in a battery (which is not shown in the drawing), and the vehicle air conditioner device 1 of the present invention is also driven with the power of the battery. That is, the vehicle air conditioner device 1 of the embodiment performs heating by a heat pump operation using a refrigerant circuit in the electric car in which it is not possible to perform heating by engine waste heat, and further, the vehicle air conditioner device selectively executes respective operation modes of dehumidifying and heating, cooling and dehumidifying, cooling, and the like.

It is to be noted that the vehicle is not limited to the electric car, and the present invention is also effective for a so-called hybrid car using the engine together with the electric motor for running, and furthermore, needless to say, the present invention is also applicable to a usual car which runs with the engine.

The vehicle air conditioner device 1 of the embodiment performs air conditioning (heating, cooling, dehumidifying, and ventilation) of a vehicle interior of the electric car, and there are successively connected, by a refrigerant pipe 13, an electric type of compressor 2 which compresses a refrigerant, a radiator 4 disposed in an air flow passage 3 of an HVAC unit 10 in which vehicle interior air passes and circulates, to let the high-temperature high-pressure refrigerant discharged from the compressor 2 flow inside via a refrigerant pipe 13G and to let this refrigerant radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which adjusts an evaporation capability in the heat absorber 9, an accumulator 12 and the like, thereby constituting a refrigerant circuit R. It is to be noted that in the outdoor heat exchanger 7, an outdoor blower 15 is disposed. The outdoor blower 15 is constituted to forcibly blow the outdoor air through the outdoor heat exchanger 7, thereby performing heat exchange between the outdoor air and the refrigerant, and consequently, the outdoor blower blows the outdoor air through the outdoor heat exchanger 7 also during stop (i.e., a velocity VSP is 0 km/h).

Furthermore, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve (an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 through the evaporation capability control valve 11.

Furthermore, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve (an opening/closing valve) 21 to be opened during the heating. Furthermore, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve (an opening/closing valve) 22 to be opened during the dehumidifying.

Furthermore, the outdoor expansion valve 6 is connected in parallel with a bypass pipe 13J, and in the bypass pipe 13J, a solenoid valve (an opening/closing valve) 20 is interposed to open in a cooling mode so that the refrigerant bypasses the outdoor expansion valve 6 to flow. It is to be noted that a pipe between the outdoor expansion valve 6 and the solenoid valve 20 and the outdoor heat exchanger 7 is denoted with 13I.

Furthermore, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Furthermore, in FIG. 1, reference numeral 23 indicates a heating medium circulating circuit disposed in the vehicle air conditioner device 1 of the embodiment. The heating medium circulating circuit 23 includes a circulating pump 30 constituting circulating means, a heating medium heating electric heater (denoted with ECH in the drawing) 35, and a heating medium-air heat exchanger 40 (auxiliary heating means in the present invention) disposed in the air flow passage 3 on an air downstream side of the radiator 4 to the flow of the air of the air flow passage 3, and these components are successively annularly connected to one another by a heating medium pipe 23A. It is to be noted that as the heating medium to circulate in the heating medium circulating circuit 23, for example, water, a refrigerant such as HFO-1234yf, a coolant or the like is employed.

Further, when the circulating pump 30 is operated and the heating medium heating electric heater 35 is energized to generate heat, the heating medium heated by the heating medium heating electric heater 35 circulates through the heating medium-air heat exchanger 40. That is, the heating medium-air heat exchanger 40 of the heating medium circulating circuit 23 becomes a so-called heater core, and complements the heating of the vehicle interior. The employing of the heating medium circulating circuit 23 can improve electric safety of a passenger.

Furthermore, in the air flow passage 3 on the air upstream side of the radiator 4, an air mix damper 28 is disposed to adjust a degree of flow of the indoor air or the outdoor air through the radiator 4. Furthermore, in the air flow passage 3 on the air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 3:
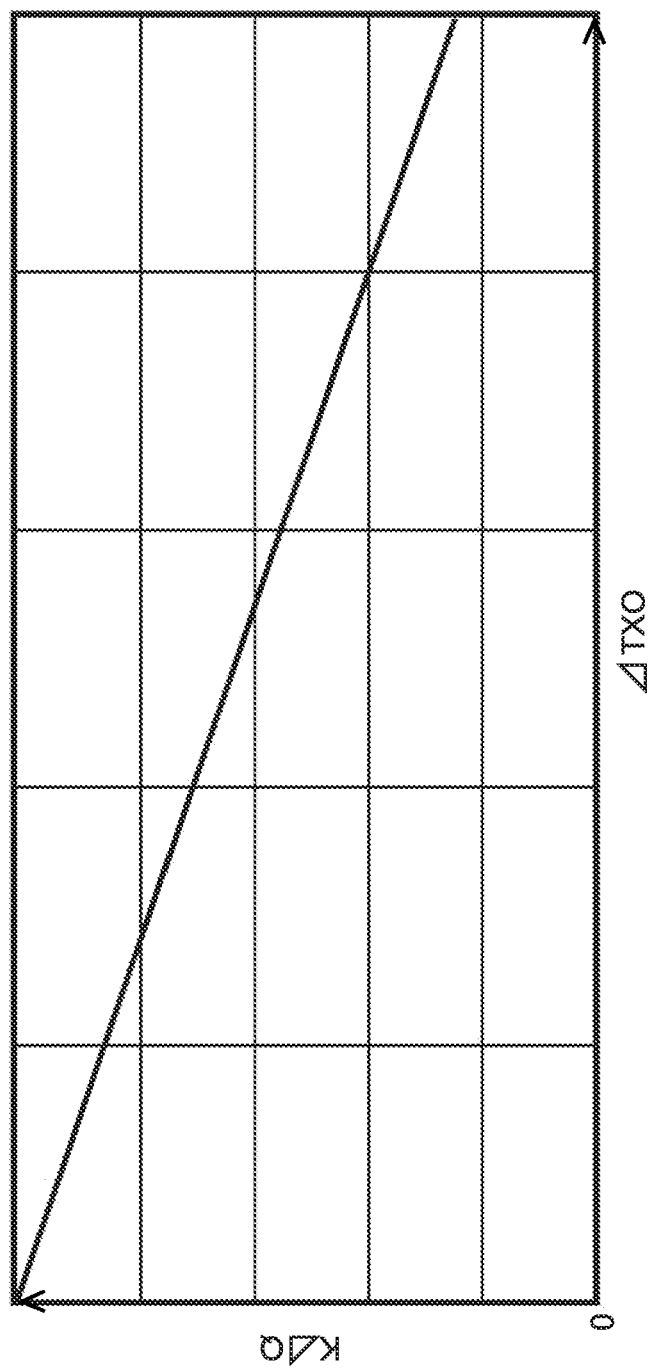
FIG. 3 is a diagram to explain a relation between ΔTXO and a coefficient KΔQ.

Next, in FIG. 3, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air blown out from the outlet 29 to the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the air passed through the radiator 4 or the temperature of the radiator 4 itself), a radiator pressure sensor 47 which detects a refrigerant pressure of the radiator 4 (the pressure in the radiator 4 or of the refrigerant which has just flowed out from the radiator 4), a heat absorber temperature sensor 48 which detects a temperature of the heat absorber 9 (the temperature of the air passed through the heat absorber 9 or the temperature of the heat absorber 9 itself), a heat absorber pressure sensor 49 which detects a refrigerant pressure of the heat absorber 9 (the pressure in the heat absorber 9 or of the refrigerant which has just flowed out from the heat absorber 9), a solar radiation sensor 51 of, e.g., a photo sensor system to detect a solar radiation amount into the vehicle, a velocity sensor 52 to detect a moving speed of the vehicle (a velocity), an air conditioning operating portion 53 to set the changing of a predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure in the outdoor heat exchanger 7 or of the refrigerant which has just flowed out from the outdoor heat exchanger 7).

Furthermore, the input of the controller 32 is further connected to respective outputs of a heating medium heating electric heater temperature sensor 50 which detects a temperature of the heating medium heating electric heater 35 of the heating medium circulating circuit 23 (the temperature of the heating medium which has just been heated by the heating medium heating electric heater 35, or the temperature of an unshown electric heater itself disposed in the heating medium heating electric heater 35), and a heating medium-air heat exchanger temperature sensor 55 which detects a temperature of the heating medium-air heat exchanger 40 (the temperature of the air flowing through the heating medium-air heat exchanger 40, or the temperature of the heating medium-air heat exchanger 40 itself).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21 and 20, the circulating pump 30, the heating medium heating electric heater 35, and the evaporation capability control valve 11. Further, the controller 32 controls these components on the basis of the outputs of the respective sensors and the setting input by the air conditioning operating portion 53.

Next, an operation of the vehicle air conditioner device 1 of the embodiment having the above-mentioned constitution will be described. The controller 32 changes and executes respective roughly divided operation modes such as a heating mode, a dehumidifying and heating mode, an internal cycle mode, a dehumidifying and cooling mode, and a cooling mode. First, a flow of the refrigerant in each operation mode will be described.

(1) Flow of Refrigerant of Heating Mode

When the heating mode is selected by the controller 32 or a manual operation to the air conditioning operating portion 53, the controller 32 opens the solenoid valve 21 and closes the solenoid valve 17, the solenoid valve 22, and the solenoid valve 20. Further, the controller operates the compressor 2 and the respective blowers 15 and 27, and the air mix damper 28 has a state of passing the air blown out from the indoor blower 27 through the radiator 4 and the heating medium-air heat exchanger 40. In consequence, a high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then flows through the refrigerant pipe 13E to reach the outdoor expansion valve 6. It is to be noted that an operation and function of the heating medium circulating circuit 23 will be described later. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15. That is, the refrigerant circuit R becomes a heat pump (denoted with HP in the drawing). Further, the low-temperature refrigerant flowing out from the outdoor heat exchanger 7 flows through the refrigerant pipe 13A and the solenoid valve 21 and the refrigerant pipe 13D, and flows from the refrigerant pipe 13C into the accumulator 12 to perform gas liquid separation therein, and then the gas refrigerant is sucked into the compressor 2, thereby repeating this circulation. The air heated in the radiator 4 flows through the heating medium-air heat exchanger 40 and is blown out from the outlet 29, thereby performing the heating of the vehicle interior.

The controller 32 controls a number of revolution of the compressor 2 on the basis of a high pressure of the refrigerant circuit R which is detected by the discharge pressure sensor 42 or the radiator pressure sensor 47, also controls a valve position of the outdoor expansion valve 6 on the basis of a temperature of the radiator 4 which is detected by the radiator temperature sensor 46 and a refrigerant pressure of the radiator 4 which is detected by the radiator pressure sensor 47, and controls a subcool degree of the refrigerant in an outlet of the radiator 4.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior. The controller 32 controls the number of revolution of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48.

(3) Flow of Refrigerant of Internal Cycle Mode

Next, in the internal cycle mode, the controller 32 shuts off the outdoor expansion valve 6 in the above state of the dehumidifying and heating mode (a shut off position), and also closes the solenoid valves 20 and 21. When the outdoor expansion valve 6 and the solenoid valves 20 and 21 close, inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Further, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but a heating capability for a consumed power of the compressor 2 is exerted. The whole amount of the refrigerant flows through the heat absorber 9 which exerts a dehumidifying operation, and hence as compared with the above dehumidifying and heating mode, a dehumidifying capability is higher, but the heating capability lowers.

The controller 32 controls the number of revolution of the compressor 2 on the basis of the temperature of the heat absorber 9 or the above-mentioned high pressure of the refrigerant circuit R. At this time, the controller 32 selects a smaller compressor target number of revolution from compressor target numbers of revolution obtainable by calculations from the temperature of the heat absorber 9 or the high pressure, to control the compressor 2.

(4) Flow of Refrigerant of Dehumidifying and Cooling Mode

Next, in the dehumidifying and cooling mode, the controller 32 opens the solenoid valve 17 and closes the solenoid valve 21, the solenoid valve 22 and the solenoid valve 20. Further, the controller operates the compressor 2 and the respective blowers 15 and 27, and the air mix damper 28 has the state of passing the air blown out from the indoor blower 27 through the radiator 4 and the heating medium-air heat exchanger 40. In consequence, the high-temperature high-pressure gas refrigerant discharged from the compressor 2 flows into the radiator 4. Through the radiator 4, the air in the air flow passage 3 passes, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior. The controller 32 controls the number of revolution of the compressor 2 on the basis of the temperature of the heat absorber 9 which is detected by the heat absorber temperature sensor 48, also controls the valve position of the outdoor expansion valve 6 on the basis of the above-mentioned high pressure of the refrigerant circuit R, and controls a refrigerant pressure of the radiator 4 (a radiator pressure Pci).

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including full open (the valve position is an upper limit of controlling)), and the air mix damper 28 has a state where the air does not pass through the radiator 4 and the heating medium-air heat exchanger 40. In consequence, the high-temperature high-pressure gas refrigerant discharged from the compressor 2 flows into the radiator 4. The air in the air flow passage 3 does not pass through the radiator 4, the refrigerant therefore only passes the radiator, and the refrigerant flowing out from the radiator 4 flows through the refrigerant pipe 13E to reach the solenoid valve 20 and the outdoor expansion valve 6.

At this time, the solenoid valve 20 is open, and hence the refrigerant bypasses the outdoor expansion valve 6 to pass the bypass pipe 13J, and flows into the outdoor heat exchanger 7 as it is, in which the refrigerant is cooled by the running therein or the outdoor air passing through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by the heat absorbing operation at this time, and hence the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 to the vehicle interior, thereby performing cooling of the vehicle interior. In this cooling mode, the controller 32 controls the number of revolution of the compressor 2 on the basis of the temperature of the heat absorber 9 which is detected by the heat absorber temperature sensor 48.

(6) Heating Mode and Auxiliary Heating by Heating Medium Circulating Circuit in Heating Mode Next, there will be described control of the compressor 2 and the outdoor expansion valve 6 in the heating mode and auxiliary heating by the heating medium circulating circuit 23 in the heating mode.

(6-1) Control of Compressor and Outdoor Expansion Valve

The controller 32 calculates a target outlet temperature TAO from Equation (I) mentioned below. The target outlet temperature TAO is a target value of the temperature of the air blown out from the outlet 29 to the vehicle interior.

$$TAO=(Tset-Tin) \times K + Tbal(f(Tset, SUN, Tam)) \quad (I),$$

in which Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and an outdoor air temperature Tam detected by the outdoor air temperature sensor 33. Further, in general, the lower the outdoor air temperature Tam is, the higher the target outlet temperature TAO becomes, and the higher the outdoor air temperature Tam is, the lower the target outlet temperature becomes.

The controller 32 calculates a target radiator temperature TCO from the target outlet temperature TAO, and next calculates a target radiator pressure PCO on the basis of the target radiator temperature TCO. Further, on the basis of the target radiator pressure PCO and a refrigerant pressure (the radiator pressure) Pci of the radiator 4 which is detected by the radiator pressure sensor 47, the controller 32 calculates a number of revolution Nc of the compressor 2, and operates the compressor 2 at the number of revolution Nc. That is, the controller 32 controls the refrigerant pressure Pci of the radiator 4 in accordance with the number of revolution Nc of the compressor 2.

Furthermore, the controller 32 calculates a target radiator subcool degree TGSC of the radiator 4 on the basis of the target outlet temperature TAO. On the other hand, the controller 32 calculates a subcool degree of the refrigerant in the radiator 4 (a radiator subcool degree SC) on the basis of the radiator pressure Pci and the temperature of the radiator 4 (a radiator temperature Tci) which is detected by the radiator temperature sensor 46. Further, on the basis of the radiator subcool degree SC and the target radiator subcool degree TGSC, the controller calculates a target valve position (a target outdoor expansion valve position TGECCV) of the outdoor expansion valve 6. Further, the controller 32 controls the valve position of the outdoor expansion valve 6 into the target outdoor expansion valve position TGECCV.

The controller 32 performs the calculation in a direction to increase the target radiator subcool degree TGSC as the target outlet temperature TAO is higher, but the present invention is not limited to this embodiment, and the controller may perform the calculation on the basis of an after-mentioned difference (a capability difference) between a required heating capability TGQ and a maximum heating capability Qhpmax, the radiator pressure Pci, or a difference (a pressure difference) between the target radiator pressure PCO and the radiator pressure Pci. In this case, the controller 32 decreases the target radiator subcool degree TGSC as the capability difference is smaller, the pressure difference is smaller, an air volume of the indoor blower 27 is smaller, or the radiator pressure Pci is smaller.

(6-2) Control 1 of Heating Medium Circulating Circuit

Furthermore, in a case where the controller 32 judges that the heating capability of the radiator 4 runs short in the heating mode, the controller energizes the heating medium heating electric heater 35 to generate heat, and operates the circulating pump 30, thereby executing heating by the heating medium-air heat exchanger 40 of the heating medium circulating circuit 23.

When the circulating pump 30 of the heating medium circulating circuit 23 operates and the heating medium heating electric heater 35 energizes, the heating medium (a high-temperature heating medium) heated by the heating medium heating electric heater 35 as described above circulates through the heating medium-air heat exchanger 40, and hence the air flowing through the radiator 4 of the air flow passage 3 heats. Therefore, in the heating mode, a target value of a temperature of the air flowing out from the heating medium-air heat exchanger 40 and blown out from the outlet 29 is the target radiator temperature TCO.

Next, control of the heating medium circulating circuit 23 in the heating mode will be described. The controller 32 calculates the required heating capability TGQ (kW) which is the required heating capability of the radiator 4, the maximum heating capability Qhpmax (kW) to be generated by the radiator 4, and an actual heating capability Qhp (kW) actually generated by the radiator 4 by use of Equation (II), Equation (III), and Equation (IV). The maximum heating capability Qhpmax is a predicted value of the maximum heating capability to be generated by the radiator 4 at the outdoor air temperature Tam at this time (i.e., an estimated maximum heating capability of the heat pump). Furthermore, the actual heating capability Qhp is a predicted value of the heating capability actually generated by the radiator 4 at the outdoor air temperature Tam and the number of revolution Nc of the compressor 2 at this time.

$$TGQ=(TCO-Te) \times Ca \times \rho \times Qair \quad (II)$$

$$Qhpmax = kQhpest1 \times Ga + kQhpest2 \times Tam + kQhpest3 \times Ncmax + kQhpest4 \quad (III)$$

$$Qhp = kQhpest1 \times Ga + kQhpest2 \times Tam + kQhpest3 \times Nc + kQhpest4 \quad (IV)$$

It is to be noted that Te is a temperature of the heat absorber 9 which is detected by the heat absorber temperature sensor 48, Ca is specific heat [kJ/m$^3$·K] of the air flowing into the radiator 4, $\rho$ is a density (a specific volume) [kg/m$^3$] of the air flowing into the radiator 4, Qair is a volume [m$^3$/h] of the air passing the radiator 4 (which is estimated from a blower voltage BLV of the indoor blower 27 or the like), Ga is an air volume (m$^3$/s) of the air passing the radiator 4, Ncmax is an upper limit number of revolution of the compressor 2, and Nc is a number of revolution (an actual number of revolution) of the compressor 2. Furthermore, kQhpest1, kQhpest2, kQhpest3 and kQhpest4 in Equations (III) and (IV) are coefficients beforehand obtained from actual measurement.

Next, the controller 32 calculates the difference between the required heating capability TGQ and the maximum heating capability Qhpmax of the radiator 4 by use of Equation (V), and calculates an estimated value TGQhtr0 of the required heating capability of the heating medium circulating circuit 23 (including the heating medium-air heat exchanger 40 that is the auxiliary heating means. Hereinafter, this also applies). Furthermore, the controller 32 calculates the difference between the maximum heating capability Qhpmax of the radiator 4 and the actual heating capability Qhp by use of Equation (VI) to calculate an offset TGQhtrh of the required heating capability of the heating medium circulating circuit 23.

$$TGQhtr0 = TGQ - Qhpmax \quad (V)$$

$$TGQhtrh = Qhpmax - Qhp \quad (VI)$$

Further, the controller 32 adds the offset TGQhtrh to the estimated value TGQhtr0 of the required heating capability in Equation (VII), thereby calculating the required heating capability TGQhtr of the heating medium circulating circuit 23.

$$TGQhtr = TGQhtr0 + TGQhtrh \quad (VII)$$

A right side of Equation (VII) is a sum of a right side of Equation (V) and a right side of Equation (VI), and hence the required heating capability TGQhtr is a difference (TGQ−Qhp) between the required heating capability TGQ of the radiator 4 and the actual heating capability Qhp of the radiator 4. The difference (TGQ−Qhp) between the required heating capability TGQ of the radiator 4 and the actual heating capability Qhp thereof is a shortage of the actual heating capability Qhp to the required heating capability TGQ of the radiator 4, and the controller 32 first calculates the required heating capability TGQhtr of the heating medium circulating circuit 23 as the heating capability which complements this shortage.

Next, the controller 32 calculates a decrease amount ΔQhp of the actual heating capability Qhp of the radiator 4 due to frosting of the outdoor heat exchanger 7 and a decrease amount ΔQhpmax of the maximum heating capability Qhpmax on the basis of a current refrigerant evaporation temperature TXO of the outdoor heat exchanger 7 which is obtainable from the outdoor heat exchanger temperature sensor 54, and a refrigerant evaporation temperature TXObase of the outdoor heat exchanger 7 in non-frosting when the outdoor air has a low-humidity environment and the frosting does not occur onto the outdoor heat exchanger 7. In this case, the controller 32 determines the refrigerant evaporation temperature TXObase of the outdoor heat exchanger 7 in non-frosting by use of Equation (VIII) mentioned next.

$$TXObase = f(Tam, Nc, BLV, VSP) \quad (VIII)$$
$$= k5 \times Tam + k6 \times Nc + k7 \times BLV + k8 \times VSP$$

Here, Tam which is a parameter of Equation (VIII) is the outdoor air temperature which is obtainable from the outdoor air temperature sensor 33 in the same manner as described above, Nc is the number of revolution of the compressor 2, BLV is a blower voltage of the indoor blower 27, VSP is a velocity which is obtainable from the velocity sensor 52, and k5 to k8 are coefficients which are beforehand obtained by experiments or the like.

In this case, when the outdoor air temperature Tam (the suction air temperature of the outdoor heat exchanger 7) becomes lower, TXObase tends to be lower. Therefore, the coefficient k5 is a positive value. Furthermore, when the number of revolution Nc of the compressor 2 is higher (the refrigerant flow rate is larger), TXObase tends to be lower. Therefore, the coefficient k6 is a negative value. Furthermore, when the blower voltage BLV is higher (the volume of the air passing the radiator 4 is larger), TXObase tends to be lower. Therefore, the coefficient k7 is a negative value. Furthermore, when the velocity VSP is lower (the velocity of the air passing through the outdoor heat exchanger 7 is lower), TXObase tends to be lower. Therefore, the coefficient k8 is a positive value.

Next, the controller 32 calculates a difference ΔTXO between the refrigerant evaporation temperature TXObase in non-frosting which is obtainable by substituting respective current parameter values into Equation (VIII) and the current refrigerant evaporation temperature TXO (ΔTXO=TXObase−TXO), and calculates a decreased heating capability Qhph of the radiator 4 and a decreased maximum heating capability Qhpmaxh due to the frosting of the outdoor heat exchanger 7 by use of a coefficient KΔQ correlated with the difference ΔTXO as in Equation (IX) and Equation (X).

$$Qhph = K\Delta Q \times Qhp \quad (IX)$$

$$Qhpmaxh = K\Delta Q \times Qhpmax \quad (X)$$

Here, FIG. 3 shows a relation between the above difference ΔTXO and the coefficient KΔQ. With proceeding of the frosting onto the outdoor heat exchanger 7, the refrigerant evaporation temperature TXO lowers, and hence when the difference ΔTXO increases, a frosting ratio of the outdoor heat exchanger 7 increases, and the heating capability of the radiator 4 decreases. The relation between the difference ΔTXO and the coefficient KΔQ shown in FIG. 3 is beforehand obtained by the actual measurement, and when the difference ΔTXO increases, i.e., when the frosting ratio of the outdoor heat exchanger 7 increases, the coefficient KΔQ decreases, and Qhph and Qhpmaxh decrease.

Furthermore, the controller calculates the decrease amount ΔQhp of the actual heating capability Qhp of the radiator 4 and the decrease amount ΔQhpmax of the maximum heating capability Qhpmax due to the frosting of the outdoor heat exchanger 7 by use of Equation (XI) and Equation (XII).

$$\Delta Qhp = Qhp - Qhph \quad (XI)$$

$$\Delta Qhpmax = Qhpmax - Qhpmaxh \quad (XII)$$

As described above, the actual heating capability Qhp of the radiator 4 decreases due to the frosting of the outdoor heat exchanger 7. Therefore, when the frosting occurs onto the outdoor heat exchanger 7, even by controlling the heating by the heating medium circulating circuit 23 in accordance with TGQhtr=TGQ−Qhp obtainable from Equation (VII) as described above, the heating capability runs short as much as the above decrease amount ΔQhp.

To eliminate such a problem, the controller 32 adds the decrease amount ΔQhp of the heating capability of the radiator 4 to the required heating capability TGQhtr of the heating medium circulating circuit 23 which is calculated with Equation (VII) mentioned above, to correct TGQhtr so that the heating capability of the heating medium-air heat exchanger 40 (the auxiliary heating means) becomes (TGQhtr+ΔQhp), thereby controlling the energization to the heating medium heating electric heater 35 of the heating medium circulating circuit 23 and the operation of the circulating pump 30.

In this way, according to the present invention, in a case where the actual heating capability Qhp of the radiator 4 runs short to the required heating capability TGQ of the radiator 4, the heating medium-air heat exchanger 40 of the heating medium circulating circuit 23 can heat the air to be supplied to the vehicle interior to complement the heating capability, thereby making it to achieve comfortable heating of the vehicle interior.

Furthermore, the heating by the heating medium-air heat exchanger 40 of the heating medium circulating circuit 23 is executed under a situation where the heating capability of the radiator 4 runs short, and hence it is possible to minimize deterioration of an efficiency due to the heating by the heating medium circulating circuit 23. Consequently, it is possible to effectively inhibit the disadvantage that a driving distance decreases especially in an electric car.

Particularly, the controller 32 calculates the decrease amount ΔQhp of the actual heating capability Qhp due to the frosting of the outdoor heat exchanger 7, and adds the decrease amount ΔQhp to the required heating capability TGQhtr of the heating medium circulating circuit 23 to execute the heating by the heating medium-air heat exchanger 40 of the heating medium circulating circuit 23, and hence in a case where the frosting occurs onto the outdoor heat exchanger 7 to decrease the actual heating capability Qhp, the heating medium circulating circuit 23 can complement the decrease amount ΔQhp, and comfort can further improve.

In this case, the controller 32 calculates the decrease amount ΔQhp of the actual heating capability Qhp due to the frosting of the outdoor heat exchanger 7 on the basis of the difference ΔTXO between the refrigerant evaporation temperature TXO of the outdoor heat exchanger 7 and the refrigerant evaporation temperature TXObase of the outdoor heat exchanger 7 in non-frosting, and hence it is possible to precisely calculate the decrease amount ΔQhp and accurately execute control of the heating medium circulating circuit 23.

It is to be noted that in Equation (IV) of the above embodiment, the controller calculates the actual heating capability Qhp that is the predicted value of the heating capability actually generated by the radiator 4, on the basis of the air volume Ga of the air passing the radiator 4, the outdoor air temperature Tam and the number of revolution (the actual number of revolution) Nc of the compressor 2, but the controller may calculate the actual heating capability Qhp by use of Equation (XIII) mentioned below.

$$Qhp=(THout-THin) \times Ca \times Ga \quad \text{(XIII)}$$

It is to be noted that THout is a temperature (° C.) of the air passed through the radiator 4, and THin is a temperature of the air before passing the radiator 4, i.e., a suction air temperature (° C.) of the radiator 4. A difference (THout−THin) therebetween is a temperature rise which occurs when the air passes the radiator 4, and also by multiplying this difference by the specific heat Ca and the air volume Ga, it is possible to calculate the actual heating capability Qhp of the radiator 4.

(6-3) Control 2 of Heating Medium Circulating Circuit

Here, when the frosting of the outdoor heat exchanger 7 increases, heat absorption (heat pump) from the outdoor air cannot be performed even by operating the compressor 2 of the refrigerant circuit R, and an operation efficiency also remarkably deteriorates. To eliminate such a problem, the controller 32 calculates the frosting ratio of the outdoor heat exchanger 7 on the basis of the difference ΔTXO (ΔTXO=TXObase−TXO) between the refrigerant evaporation temperature TXObase of the outdoor heat exchanger 7 in non-frosting and the current refrigerant evaporation temperature TXO described above, and in a case where this frosting ratio is not less than a predetermined value, the controller stops the compressor 2 of the refrigerant circuit R.

Figure 4:
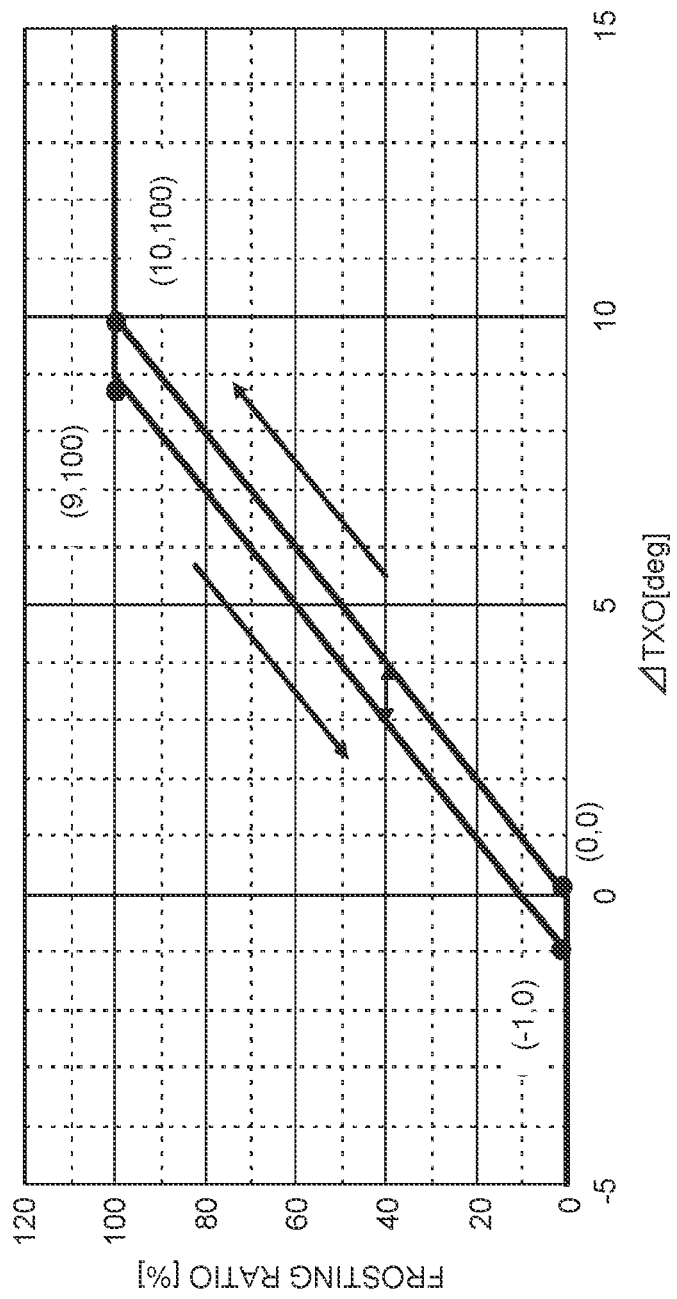
FIG. 4 is a diagram to explain a relation between ΔTXO and a frosting ratio of an outdoor heat exchanger.

FIG. 4 shows a relation between the difference ΔTXO and the frosting ratio when the frosting ratio of the outdoor heat exchanger 7 is judged from this difference ΔTXO. The controller 32 judges that the frosting ratio is 0 when the difference ΔTXO is 0. When the difference ΔTXO rises from this state up to 10 (deg), the frosting ratio increases up to 100% at a predetermined inclination angle. The controller 32 stops the compressor 2 in a case where the frosting ratio is the predetermined value (e.g., 100%) in the embodiment. Further, the controller operates the heating medium heating electric heater 35 and the circulating pump 30 so that the heating medium-air heat exchanger 40 of the heating medium circulating circuit 23 generates the required heating capability TGQ (TGQhtr=TGQ).

Further, when ΔTXO lowers below 9 (deg) and lowers therefrom to −1 (deg), the frosting ratio also decreases down to 0 at a predetermined inclination angle (a hysteresis of 1 deg). The controller 32 cancels start prohibition of the compressor 2 when the frosting ratio is smaller than the predetermined value (e.g., 100%), and the controller returns to the heating mode again by the radiator 4 of the refrigerant circuit R and the heating medium circulating circuit 23.

In this way, a proceeding degree of the frosting onto the outdoor heat exchanger 7 is grasped from the difference ΔTXO, and in a case where the frosting proceeds, the vehicle air conditioner device changes to the heating of the vehicle interior only by the heating medium-air heat exchanger 40 of the heating medium circulating circuit 23, and hence it is possible to continuously perform the heating of the vehicle interior by the heating medium circulating circuit 23 while preventing further growth of the frost formed on the outdoor heat exchanger 7 of the refrigerant circuit R or promoting melting of the frost.

(6-4) Control 3 of Heating Medium Circulating Circuit

Figure 5:
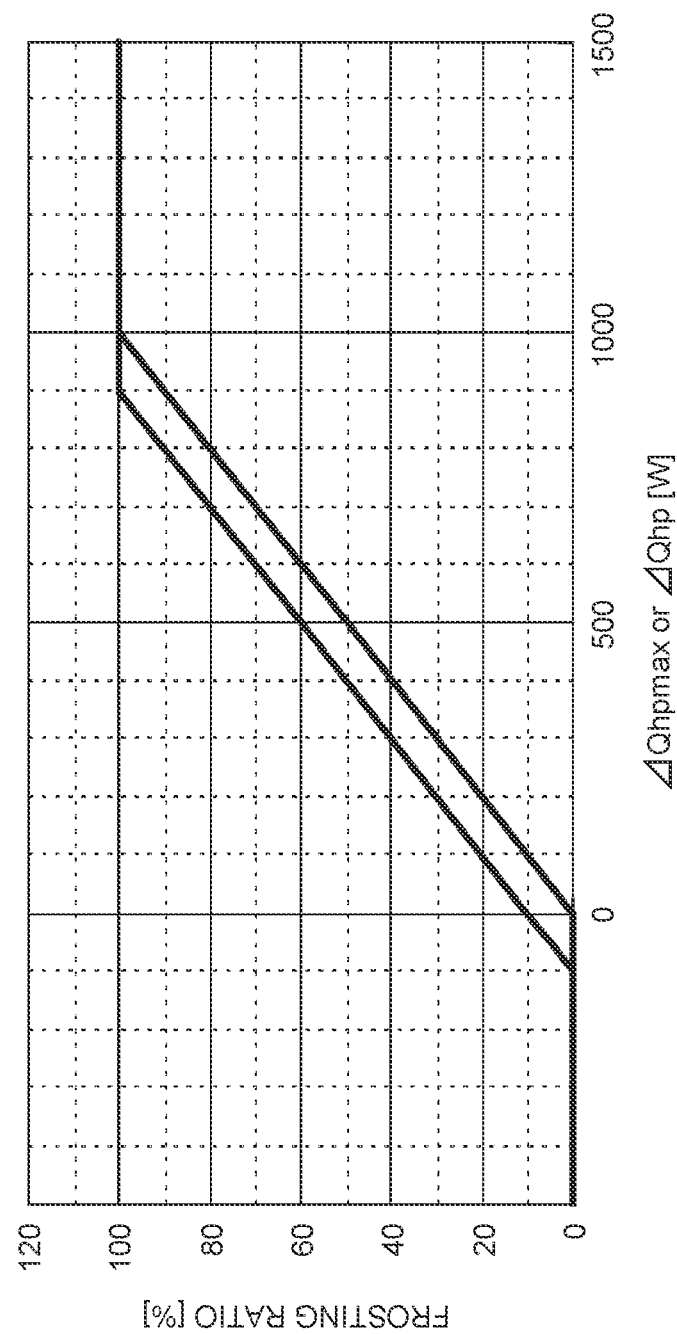
FIG. 5 is a diagram to explain a relation between ΔQhpmax or ΔQhp and the frosting ratio of the outdoor heat exchanger.

Next, FIG. 5 shows another example of such stop control of the compressor 2. In the above example (6-3), the controller calculates the frosting ratio of the outdoor heat exchanger 7 on the basis of the difference ΔTXO, but the present invention is not limited to this example, and the controller may calculate the frosting ratio of the outdoor heat exchanger 7 on the basis of the decrease amount ΔQhpmax of the maximum heating capability Qhpmax of the radiator 4 described above or the decrease amount ΔQhp of the actual heating capability Qhp, and may stop the compressor 2 of the refrigerant circuit R in a case where this frosting ratio is not less than the predetermined value.

FIG. 5 shows a relation between the decrease amount ΔQhpmax or ΔQhp and the frosting ratio when the frosting ratio of the outdoor heat exchanger 7 is judged from the decrease amount ΔQhpmax or ΔQhp. The controller 32 judges that the frosting ratio is 0 when the decrease amount ΔQhpmax or ΔQhp is 0. When the decrease amount ΔQhpmax or ΔQhp increases from this state up to 1000 (W), the frosting ratio increases up to 100% at a predetermined inclination angle. The controller 32 stops the compressor 2 in a case where the frosting ratio is the predetermined value (e.g., 100%) in the embodiment. Further, the controller operates the heating medium heating electric heater 35 and the circulating pump 30 so that the heating medium-air heat exchanger 40 of the heating medium circulating circuit 23 generates the required heating capability TGQ (TGQhtr=TGQ).

Further, when the decrease amount ΔQhpmax or ΔQhp decreases below 900 (W) and decreases therefrom to −100 (W), the frosting ratio also decreases down to 0 at a predetermined inclination angle (a hysteresis of 100 W). The controller 32 cancels the start prohibition of the compressor 2 when the frosting ratio is smaller than the predetermined value (e.g., 100%), and the controller returns to the heating mode again by the radiator 4 of the refrigerant circuit R and the heating medium circulating circuit 23.

In this way, the proceeding degree of the frosting onto the outdoor heat exchanger 7 is grasped from the decrease amount ΔQhpmax of the maximum heating capability Qhpmax of the radiator 4 or the decrease amount ΔQhp of the actual heating capability Qhp, and in the case where the frosting proceeds, even by changing to the heating of the vehicle interior only by the heating medium-air heat exchanger 40 of the heating medium circulating circuit 23, it is possible to continuously perform the heating of the vehicle interior by the heating medium circulating circuit 23 while preventing further growth of the frost formed on the outdoor heat exchanger 7 of the refrigerant circuit R or promoting the melting of the frost.

(6-5) Control 4 of Heating Medium Circulating Circuit

It is to be noted that in the above respective examples, the frosting ratio of the outdoor heat exchanger 7 is estimated from the difference ΔTXO, the decrease amount ΔQhpmax of the maximum heating capability Qhpmax of the radiator 4, or the decrease amount ΔQhp of the actual heating capability Qhp to stop the compressor 2, but the present invention is not limited to this example, and the controller may directly judge the degree of the frosting of the outdoor heat exchanger 7 from the decrease amount ΔQhpmax of the maximum heating capability Qhpmax of the radiator 4 or the decrease amount ΔQhp of the actual heating capability Qhp, and in a case where the decrease amount ΔQhpmax or ΔQhp is not less than the predetermined value, the controller may judge that the frosting of the outdoor heat exchanger 7 proceeds, to stop the compressor 2.

(7) Another Constitutional Example 1

Figure 6:
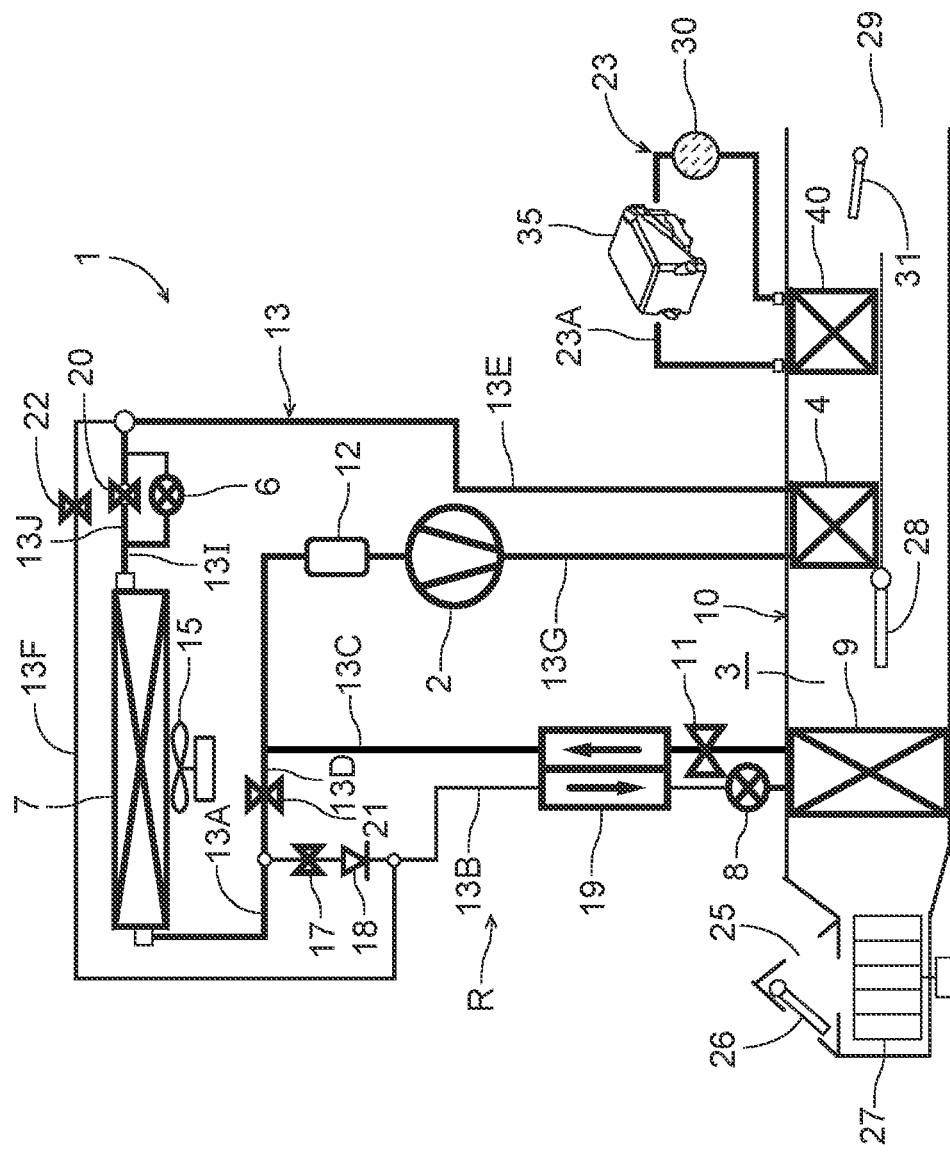
FIG. 6 is a constitutional view of a vehicle air conditioner device of another embodiment to which the present invention is applied.

Next, FIG. 6 shows another constitutional view of a vehicle air conditioner device 1 of the present invention. In this embodiment, an outdoor heat exchanger 7 does not include a receiver drier portion 14 and a subcooling portion 16, and a refrigerant pipe 13A extending out from the outdoor heat exchanger 7 is connected to a refrigerant pipe 13B via a solenoid valve 17 and a check valve 18. Furthermore, a refrigerant pipe 13D branching from the refrigerant pipe 13A is connected to a refrigerant pipe 13C on a downstream side of an internal heat exchanger 19 similarly via a solenoid valve 21.

The other constitution is similar to the example of FIG. 1. In this way, the present invention is also effective in the vehicle air conditioner device 1 of a refrigerant circuit R employing the outdoor heat exchanger 7 which does not have the receiver drier portion 14 and the subcooling portion 16.

(8) Still Another Constitutional Example 2

Figure 7:
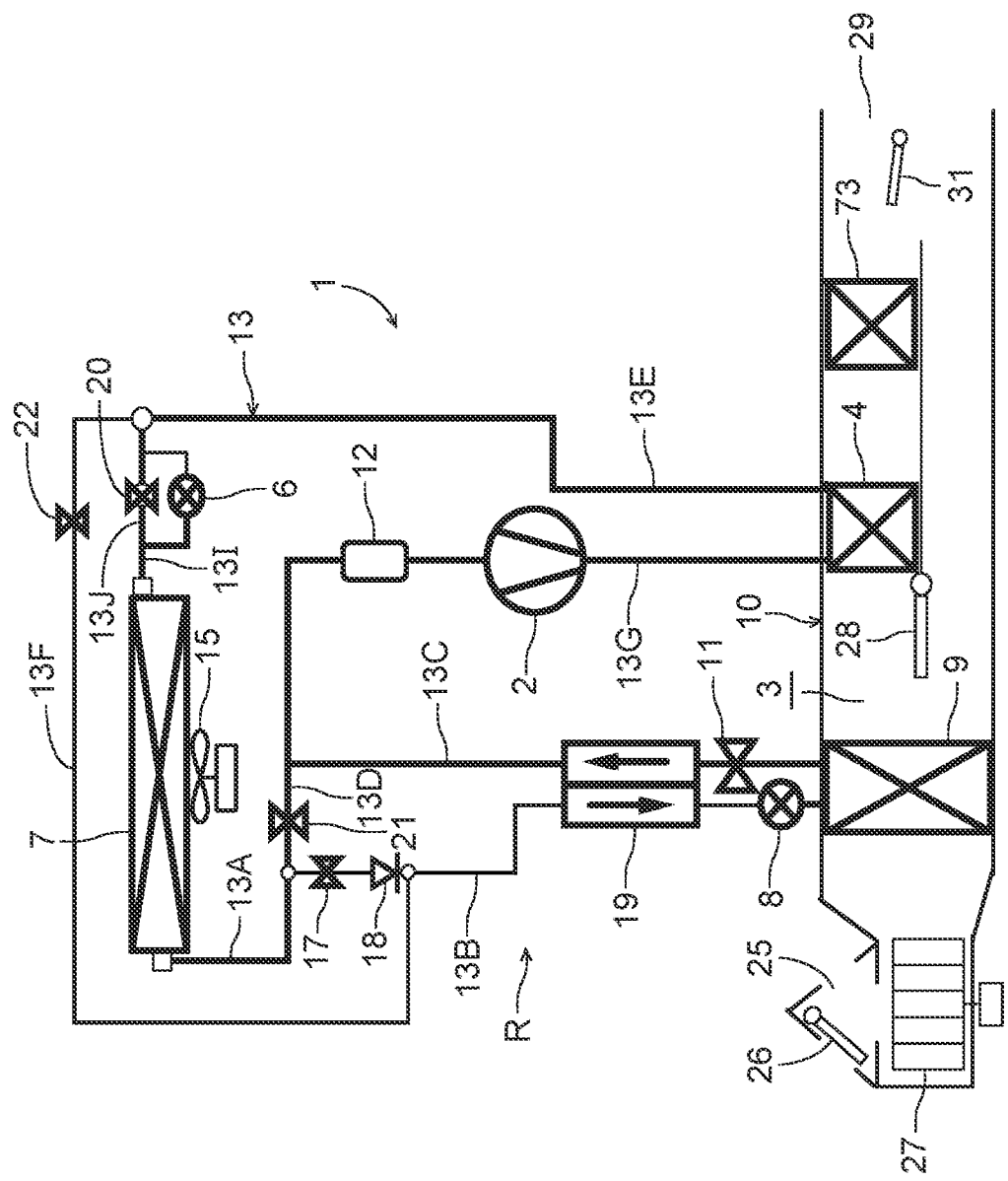
FIG. 7 is a constitutional view of a vehicle air conditioner device of still another embodiment to which the present invention is applied.

Next, FIG. 7 shows still another constitutional view of a vehicle air conditioner device 1 of the present invention. In this case, the heating medium circulating circuit 23 of FIG. 6 is replaced with an electric heater 73. In the abovementioned case of the heating medium circulating circuit 23, the heating medium heating electric heater 35 is disposed outside a vehicle interior and outside an air flow passage 3, and hence electric safety is acquired, but a constitution is complicated.

On the other hand, when the electric heater 73 is disposed in the air flow passage 3 as shown in FIG. 7, the constitution is remarkably simplified. In this case, the electric heater 73 becomes auxiliary heating means, whereby the controller 32 executes the above-mentioned control. Further, the present invention is also effective in the vehicle air conditioner device 1 of a refrigerant circuit R employing the electric heater 73.

(9) Further Constitutional Example 3

Figure 8:
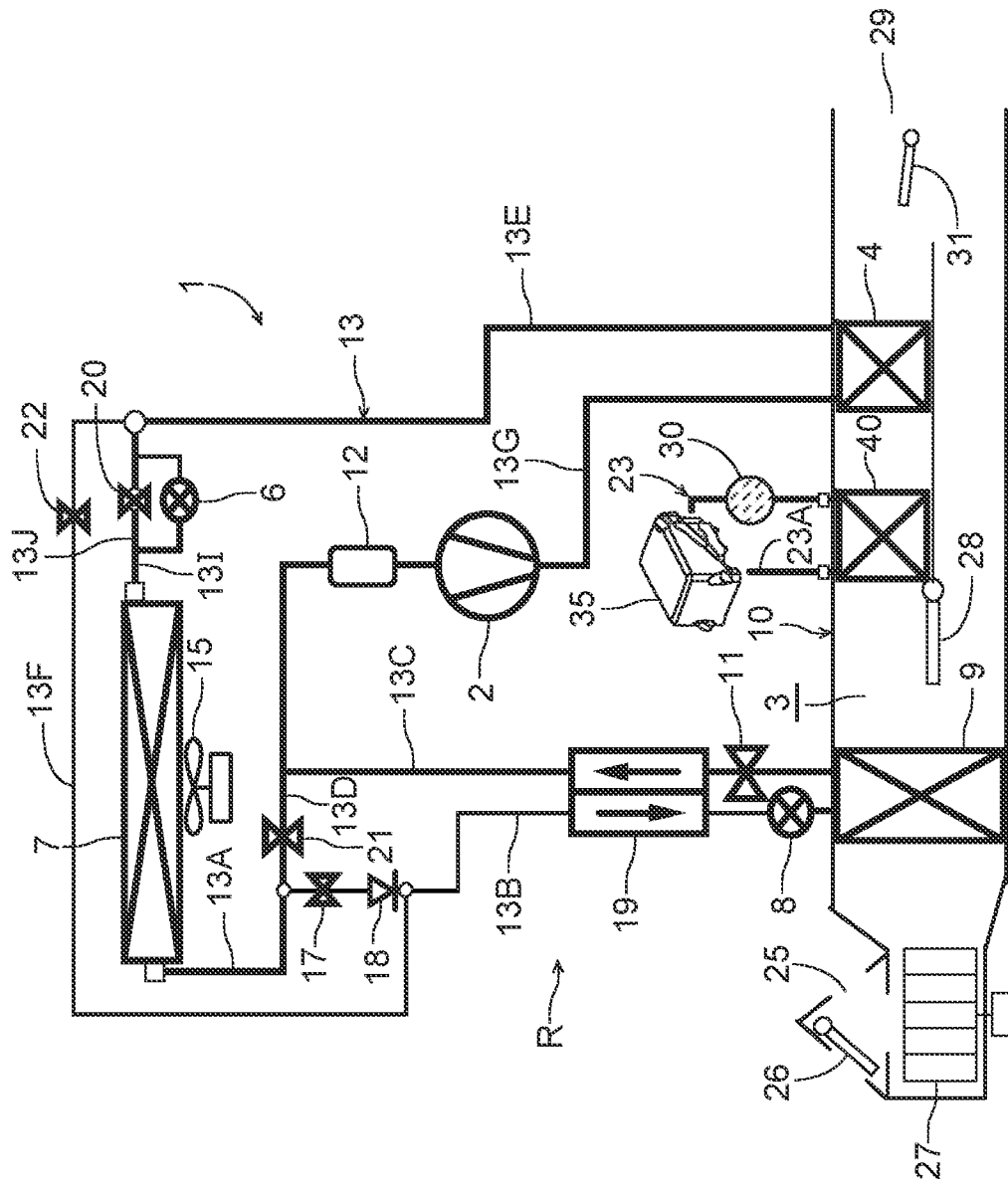
FIG. 8 is a constitutional view of a vehicle air conditioner device of a further embodiment to which the present invention is applied.

Next, FIG. 8 shows a further constitutional view of a vehicle air conditioner device 1 of the present invention. It is to be noted that a refrigerant circuit R of this embodiment is similar to FIG. 6. However, in this case, a heating medium-air heat exchanger 40 of a heating medium circulating circuit 23 is disposed on an upstream side of a radiator 4 and on a downstream side of an air mix damper 28 to a flow of air of an air flow passage 3. The other constitution is similar to FIG. 6.

In this case, the heating medium-air heat exchanger 40 is positioned on the upstream side of the radiator 4 in the air flow passage 3, and hence during an operation of the heating medium circulating circuit 23, air is heated by the heating medium-air heat exchanger 40 and then flows into the radiator 4. In this way, the present invention is also effective in the vehicle air conditioner device 1 in which the heating medium-air heat exchanger 40 is disposed on the upstream side of the radiator 4, and especially in this case, there does not occur the problem caused by the fact that a temperature of a heating medium in the heating medium circulating circuit 23 is low. Consequently, coordinated heating with the radiator 4 becomes easy, but the air passed through the heating medium-air heat exchanger 40 flows into the radiator 4. Therefore, to each of Equations (III) and (IV) to calculate a maximum heating capability Qhpmax and an actual heating capability Qhp of the radiator 4 described above, there is added a value of a suction air temperature THin of the radiator 4 which is multiplied by a predetermined coefficient kOhpest5 (this is also a coefficient beforehand obtained from actual measurement).

The suction air temperature THin of the radiator 4 is the temperature of the air passed through the heating medium-air heat exchanger 40 which is detected by a heating medium-air heat exchanger temperature sensor 55. In this way, in a case where the heating medium-air heat exchanger 40 of the heating medium circulating circuit 23 is disposed together with the radiator 4 on an upstream side of the radiator 4 to a flow of the air of the air flow passage 3, the controller 32 calculates the maximum heating capability Qhpmax and the actual heating capability Qhp in consideration of the suction air temperature THin of the radiator 4. Consequently, in a case where the air heated by the heating medium-air heat exchanger 40 flows into the radiator 4, it is possible to correctly calculate the maximum heating capability Qhpmax of the radiator 4 and the actual heating capability Qhp thereof in consideration of a change of a heat quantity which accompanies the inflow of the heated air.

(10) Further Constitutional Example 4

Figure 9:
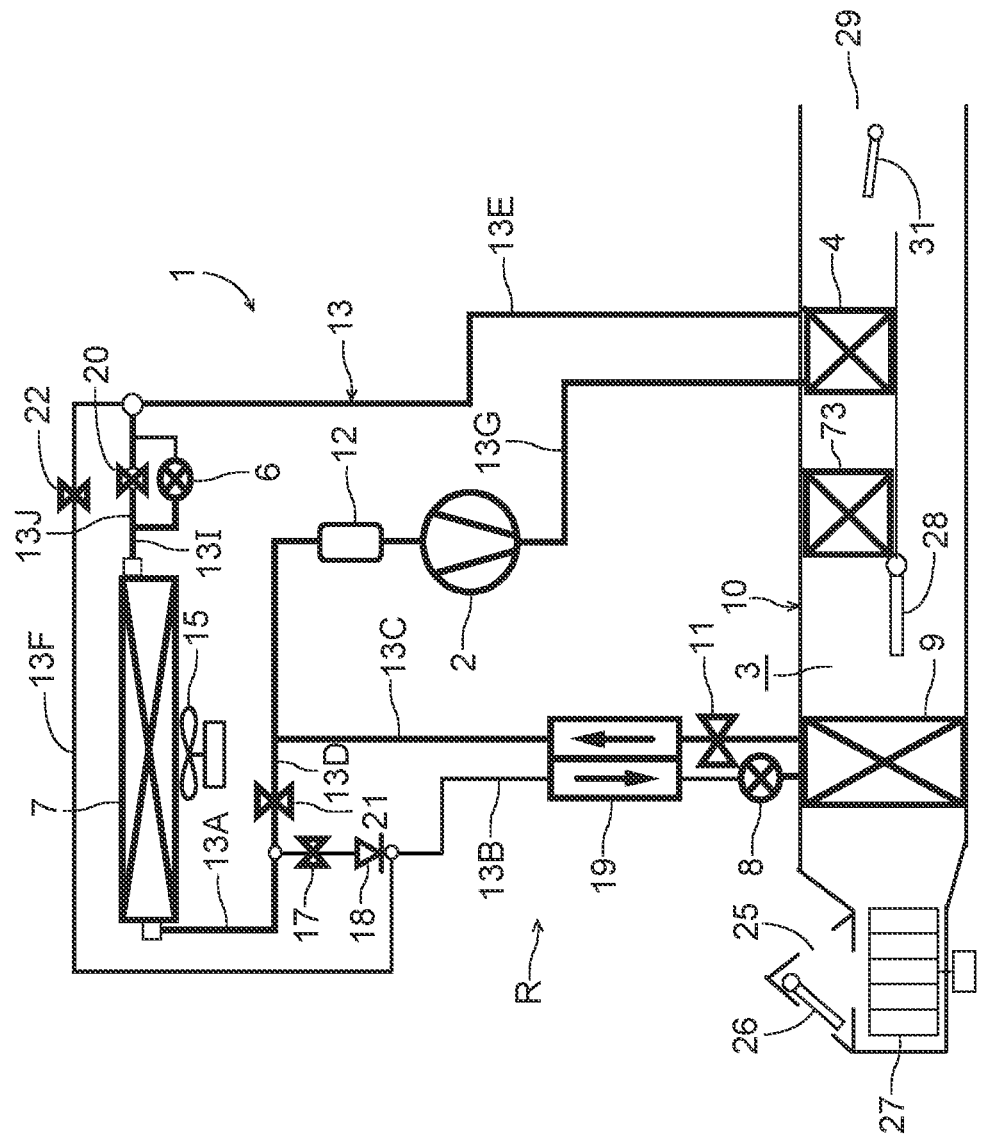
FIG. 9 is a constitutional view of a vehicle air conditioner device of a further embodiment to which the present invention is applied.
Figure 11:
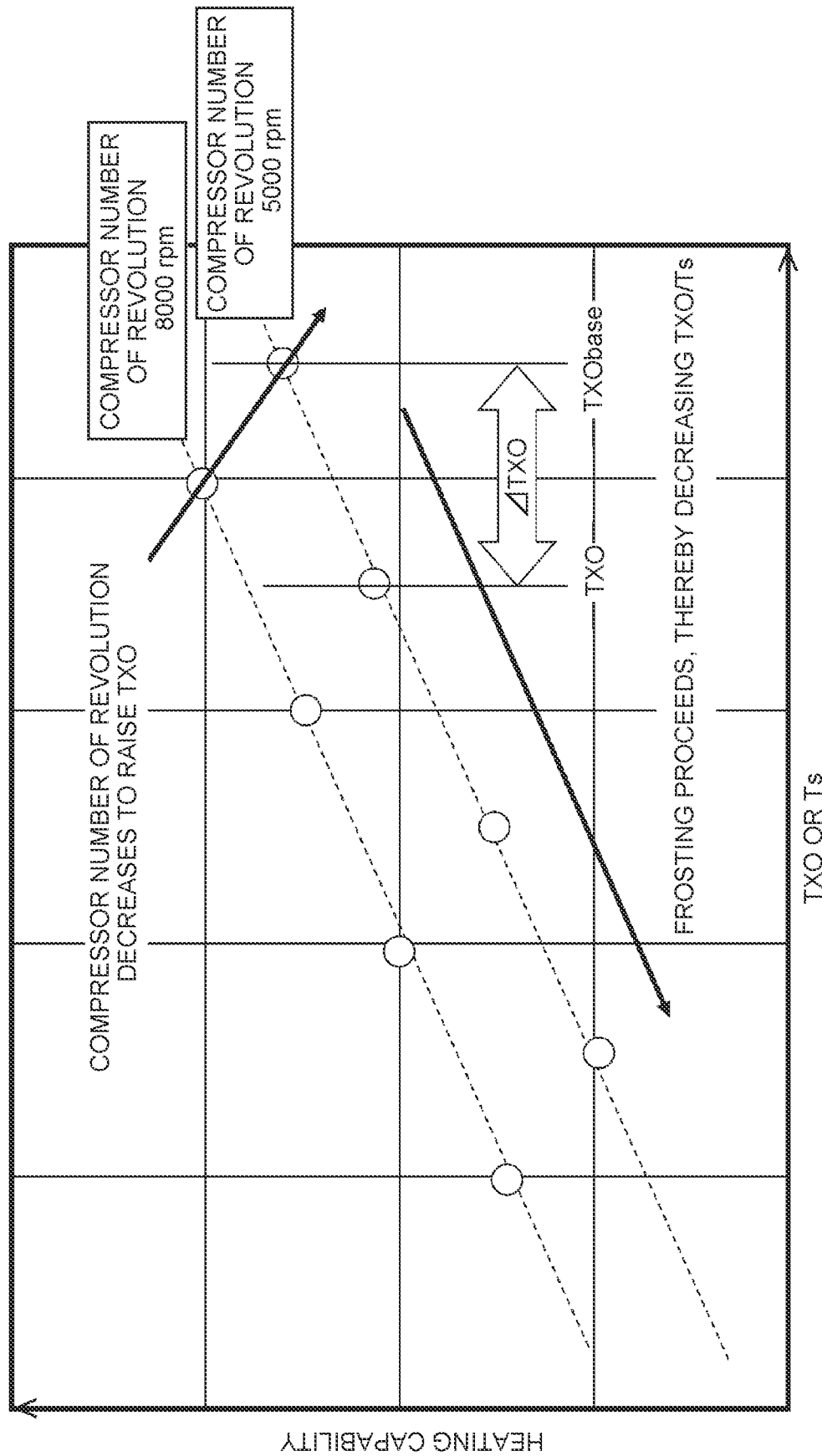
FIG. 11 is a diagram showing a relation between TXO or Ts and a heating capability of a radiator.

Next, FIG. 9 shows a further constitutional view of a vehicle air conditioner device 1 of the present invention. In this case, the heating medium circulating circuit 23 of FIG. 8 is replaced with an electric heater 73. The present invention is also effective for the vehicle air conditioner device 1 of a refrigerant circuit R employing the electric heater 73.

(11) Further Constitutional Example 5

Figure 10:
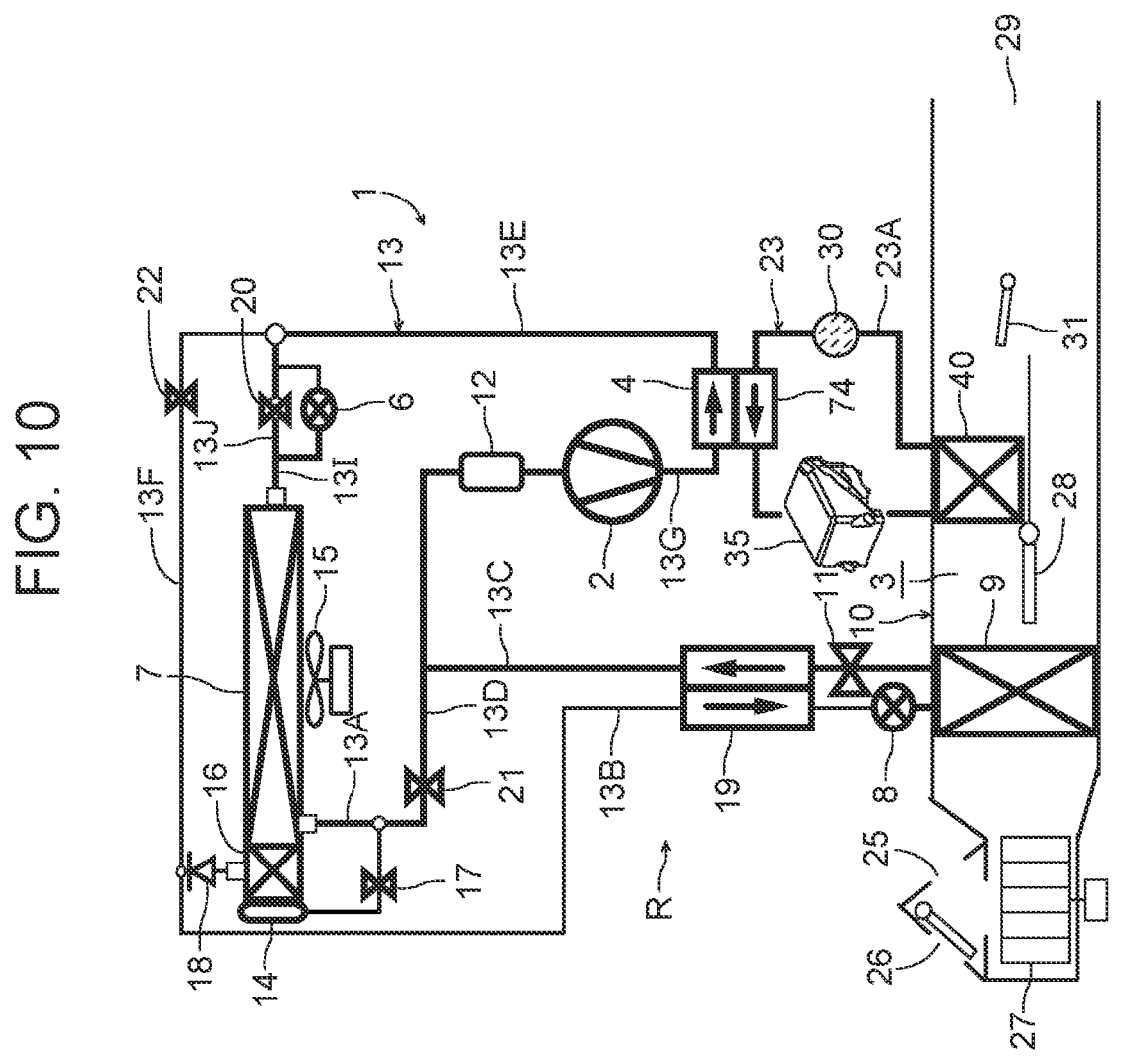

Next, FIG. 10 shows a still further constitutional view of a vehicle air conditioner device 1 of the present invention. Pipe constitutions of a refrigerant circuit R and a heating medium circulating circuit 23 (auxiliary heating means) of this embodiment are basically similar to the case of FIG. 1, but a radiator 4 is not disposed in an air flow passage 3, and is disposed outside the air flow passage. Instead, in the radiator 4, a heating medium-refrigerant heat exchanger 74 of this case is disposed in a heat exchange relation.

The heating medium-refrigerant heat exchanger 74 is connected to a heating medium pipe 23A between a circulating pump 30 and a heating medium heating electric heater 35 of the heating medium circulating circuit 23, and a heating medium-air heat exchanger 40 of the heating medium circulating circuit 23 is disposed in the air flow passage 3. According to such a constitution, a heating medium discharged from the circulating pump 30 performs heat exchange with a refrigerant flowing through the radiator 4, is heated by the refrigerant, is next heated by the heating medium heating electric heater 35 (in a case where the heater is energized to generate heat), and then radiates heat in the heating medium-air heat exchanger 40, thereby heating air to be supplied from the air flow passage 3 to a vehicle interior.

Also in the vehicle air conditioner device 1 of such a constitution, in a case where a heating capability of the radiator 4 runs short, the heating medium heating electric heater 35 is energized to heat the heating medium flowing in the heating medium pipe 23A, thereby enabling auxiliary heating, and as compared with a case where an electric heater is disposed in the air flow passage 3 as described above, it is possible to achieve electrically safer vehicle interior heating.

It is to be noted that in the embodiments, the present invention is applied to the vehicle air conditioner device 1 which changes and executes the respective operation modes of the heating mode, the dehumidifying and heating mode, the dehumidifying and cooling mode and the cooling mode, but the present invention is not limited to these embodiments, and is also effective for a vehicle air conditioner device which only performs the heating mode.

Furthermore, the constitution and respective numeric values of the refrigerant circuit R described in the above respective embodiments are not limited to the embodiments, and are changeable without departing from the gist of the present invention.

DESCRIPTION OF REFERENCE NUMERALS 1 vehicle air conditioner device
2 compressor
3 air flow passage
4 radiator
6 outdoor expansion valve
7 outdoor heat exchanger
8 indoor expansion valve
9 heat absorber
11 evaporation capability control valve
17, 20, 21 and 22 solenoid valve
23 heating medium circulating circuit (auxiliary heating means)
26 suction changing damper
27 indoor blower (blower fan)
28 air mix damper
30 circulating pump (circulating means)
32 controller (control means)
35 heating medium heating electric heater (electric heater)
40 heating medium-air heat exchanger (auxiliary heating means)
70 and 74 heating medium-refrigerant heat exchanger
73 electric heater (auxiliary heating means)
R refrigerant circuit

The invention claimed is:
1. A vehicle air conditioner device comprising:
a compressor which compresses a refrigerant;
an air flow passage through which air to be supplied to a vehicle interior flows;
a radiator which lets the refrigerant radiate heat to heat the air to be supplied from the air flow passage to the vehicle interior;
a heat absorber which lets the refrigerant absorb heat to cool the air to be supplied from the air flow passage to the vehicle interior;
an outdoor heat exchanger disposed outside the vehicle interior to let the refrigerant radiate or absorb heat; and
a controller,
the vehicle air conditioner device executing at least a heating mode in which the controller lets the refrigerant discharged from the compressor radiate heat in the radiator, decompresses the refrigerant by which heat has been radiated, and then lets the refrigerant absorb heat in the outdoor heat exchanger,
the vehicle air conditioner device comprising:
auxiliary heating device for heating the air to be supplied from the air flow passage to the vehicle interior,
wherein on the basis of a required heating capability TGQ which is a required heating capability of the radiator and an actual heating capability Qhp which is actually generated by the radiator, the controller calculates a required heating capability TGQhtr of the auxiliary heating device to complement a shortage of the actual heating capability Qhp to the required heating capability TGQ, and
the controller calculates a decrease amount ΔQhp of the actual heating capability Qhp due to frosting of the outdoor heat exchanger on the basis of a difference ΔTXO between the refrigerant evaporation temperature TXO of the outdoor heat exchanger and the refrigerant evaporation temperature TXObase of the outdoor heat exchanger in non-frosting, and
adds the decrease amount ΔQhp to the required heating capability TGQhtr of the auxiliary heating device to execute heating by the auxiliary heating device.

2. The vehicle air conditioner device according to claim 1, wherein the controller calculates a frosting ratio of the outdoor heat exchanger on the basis of the difference ΔTXO, and in a case where the frosting ratio is not less than a predetermined value, the controller stops the compressor and controls the auxiliary heating device in accordance with the required heating capability TGQ.

3. The vehicle air conditioner device according to claim 1, wherein the controller calculates the frosting ratio of the outdoor heat exchanger on the basis of the decrease amount ΔQhp of the actual heating capability, and in a case where the frosting ratio is not less than a predetermined value, the controller stops the compressor and controls the auxiliary heating device in accordance with the required heating capability TGQ.

4. The vehicle air conditioner device according to claim 1, wherein the controller calculates a maximum heating capability Qhpmax to be generated by the radiator, calculates a decrease amount ΔQhpmax of the maximum heating capability Qhpmax due to the frosting of the outdoor heat exchanger on the basis of the difference ΔTXO, and
calculates a frosting ratio of the outdoor heat exchanger on the basis of the decrease amount ΔQhpmax of the maximum heating capability, and in a case where the frosting ratio is not less than a predetermined value, the controller stops the compressor and controls the auxiliary heating device in accordance with the required heating capability TGQ.

5. The vehicle air conditioner device according to claim 1,
wherein the controller calculates a maximum heating capability Qhpmax to be generated by the radiator, and calculates a decrease amount ΔQhpmax of the maximum heating capability Qhpmax due to the frosting of the outdoor heat exchanger on the basis of the difference ΔTXO, and in a case where the decrease amount ΔQhpmax is not less than a predetermined value, the controller stops the compressor and controls the auxiliary heating device in accordance with the required heating capability TGQ.

6. The vehicle air conditioner device according to claim 1,
wherein the controller stops the compressor and controls the auxiliary heating device in accordance with the required heating capability TGQ in a case where the decrease amount ΔQhp of the actual heating capability is not less than a predetermined value.

7. The vehicle air conditioner device according to claim 1,
wherein the controller calculates a maximum heating capability Qhpmax on the basis of an air volume Ga of air passing the radiator, an outdoor air temperature Tam, and an upper limit number of revolution Ncmax of the compressor, and calculates the actual heating capability Qhp on the basis of the air volume Ga, the outdoor air temperature Tam and an actual number of revolution Nc of the compressor.

8. The vehicle air conditioner device according to claim 1,
wherein the controller calculates the actual heating capability Qhp on the basis of a difference (THout−THin) between a temperature THout of air passed through the radiator and a suction air temperature THin of the radiator, specific heat Ca of the air flowing into the radiator, and the air volume Ga of the air passing the radiator.

9. The vehicle air conditioner device according to claim 1, comprising:
a heating medium circulating circuit which has a heating medium-air heat exchanger, an electric heater, and circulating means and in which the circulating means circulates a heating medium heated by the electric heater through the heating medium-air heat exchanger,
wherein the heating medium-air heat exchanger constitutes the auxiliary heating device.

10. The vehicle air conditioner device according to claim 1,
wherein the auxiliary heating device is constituted of an electric heater.

11. The vehicle air conditioner device according to claim 2,
wherein the controller calculates a maximum heating capability Qhpmax on the basis of an air volume Ga of air passing the radiator, an outdoor air temperature Tam, and an upper limit number of revolution Ncmax of the compressor, and calculates the actual heating capability Qhp on the basis of the air volume Ga, the outdoor air temperature Tam and an actual number of revolution Ne of the compressor.

12. The vehicle air conditioner device according to claim 6,
wherein the controller calculates a maximum heating capability Qhpmax on the basis of an air volume Ga of air passing the radiator, an outdoor air temperature Tam, and an upper limit number of revolution Ncmax of the compressor, and calculates the actual heating capability Qhp on the basis of the air volume Ga, the outdoor air temperature Tam and an actual number of revolution Ne of the compressor.

13. The vehicle air conditioner device according to claim 3,
wherein the controller calculates the actual heating capability Qhp on the basis of a difference (THout−THin) between a temperature THout of air passed through the radiator and a suction air temperature THin of the radiator, specific heat Ca of the air flowing into the radiator, and an air volume Ga of the air passing the radiator.

14. The vehicle air conditioner device according to claim 6,
wherein the controller calculates the actual heating capability Qhp on the basis of a difference (THout−THin) between a temperature THout of air passed through the radiator and a suction air temperature THin of the radiator, specific heat Ca of the air flowing into the radiator, and an air volume Ga of the air passing the radiator.

* * * * *